(12) United States Patent  (10) Patent No.: US 12,108,438 B2
Ly et al.  (45) Date of Patent: Oct. 1, 2024

(54) DYNAMIC SLOT AGGREGATION INDICATION FOR RANDOM ACCESS PROCEDURE

(71) Applicant: QUALCOMM Incorporated, San Diego, CA (US)

(72) Inventors: Hung Dinh Ly, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 17/308,899

(22) Filed: May 5, 2021

(65) Prior Publication Data

US 2021/0352712 A1  Nov. 11, 2021

Related U.S. Application Data

(60) Provisional application No. 63/021,017, filed on May 6, 2020.

(51) Int. Cl.
*H04W 74/00* (2009.01)
*H04L 1/1812* (2023.01)
(Continued)

(52) U.S. Cl.
CPC ......... *H04W 74/008* (2013.01); *H04L 1/1819* (2013.01); *H04W 72/0446* (2013.01);
(Continued)

(58) Field of Classification Search
None
See application file for complete search history.

(56) References Cited

U.S. PATENT DOCUMENTS 5,146,614 A * 9/1992 Furuno ............... H04B 1/3877
455/571
2015/0319776 A1  11/2015 Seo et al.
(Continued)

FOREIGN PATENT DOCUMENTS

CN  109842952 A  6/2019
EP  3799505 A1  3/2021
(Continued)

OTHER PUBLICATIONS

CATT:"Discussion on Type A PUSCH Repetitions for Msg3", 3GPP TSG RAN WG1 #104-e, 3GPP Draft,R1-2100401, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, 5 Pages, Jan. 19, 2021 (Jan. 19, 2021), XP051971004, Retrieved from the Internet: URL: https://ftp.3gpp.org/tsg_ran/WG1_RL1/TSGR1_104-e/Docs/ R1-2100401.zip [retrieved on Jan. 19, 2021] section 2, figure 1, page2, last paragraph, p. 3, first paragraph.
(Continued)

*Primary Examiner* — Brandon M Renner
(74) *Attorney, Agent, or Firm* — Kevin M. Donnelly; Seyfarth Shaw LLP

(57) ABSTRACT

A method for wireless communication by a user equipment (UE) includes transmitting, to a base station, a random access preamble to initiate a random access procedure. The method also includes receiving, from the base station based on transmitting the random access preamble, a downlink message comprising a repetition number indicator. The method further includes transmitting a number of repetitions of a physical uplink channel based on the repetition number indicator.

16 Claims, 13 Drawing Sheets

(51) Int. Cl.
  *H04W 72/0446*  (2023.01)
  *H04W 72/1268* (2023.01)
  *H04W 72/23*   (2023.01)
  *H04W 74/0833* (2024.01)
  *H04W 76/11*   (2018.01)

(52) U.S. Cl.
  CPC ....... *H04W 72/1268* (2013.01); *H04W 72/23* (2023.01); *H04W 74/0833* (2013.01); *H04W 74/0841* (2013.01); *H04W 76/11* (2018.02)

(56) References Cited

U.S. PATENT DOCUMENTS

| | | | | |
|---|---|---|---|---|
| 2016/0026832 | A1* | 1/2016 | Wadman | G06F 16/285 |
| | | | | 340/10.1 |
| 2016/0300480 | A1* | 10/2016 | Mitra | G08C 17/02 |
| 2016/0338110 | A1 | 11/2016 | Wang et al. | |
| 2017/0141833 | A1* | 5/2017 | Kim | H04L 5/0057 |
| 2017/0286094 | A1* | 10/2017 | Westerkowsky | G06F 8/654 |
| 2018/0343043 | A1* | 11/2018 | Hakola | H04W 36/04 |
| 2020/0083991 | A1* | 3/2020 | Nader | H04L 1/1864 |
| 2020/0359425 | A1* | 11/2020 | Chen | H04W 76/11 |
| 2021/0282137 | A1* | 9/2021 | Wang | H04W 72/23 |
| 2021/0360610 | A1* | 11/2021 | Kim | H04L 5/0094 |
| 2022/0116999 | A1* | 4/2022 | Xiong | H04L 5/0048 |
| 2022/0123902 | A1* | 4/2022 | Panteleev | H04L 5/0053 |
| 2022/0132622 | A1* | 4/2022 | Ahn | H04W 88/06 |
| 2022/0159706 | A1* | 5/2022 | Panteleev | H04L 1/08 |
| 2022/0386361 | A1* | 12/2022 | Takahashi | H04L 1/189 |
| 2022/0400511 | A1* | 12/2022 | Li | H04W 24/08 |
| 2023/0024437 | A1* | 1/2023 | Zhang | H04W 72/1263 |
| 2023/0163880 | A1* | 5/2023 | Liang | H04L 1/08 |
| | | | | 714/726 |

FOREIGN PATENT DOCUMENTS

| | | |
|---|---|---|
| WO | WO-2019141061 A1 | 7/2019 |
| WO | 2019224876 A1 | 11/2019 |
| WO | WO-2019213917 A1 | 11/2019 |

OTHER PUBLICATIONS

CMCC: PUSCH Segmentation and Repetition , 3GPP TSG-RAN WG2 #107, 3GPP Draft, R2-1912948 PUSCH Segmentation and Repetition, Revision of R2-1909454, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 16, 2019-Aug. 30, 2019, 3 Pages, Oct. 4, 2019 (Oct. 4, 2019), XP051804747, Retrieved from the Internet: URL: https://ftp.3gpp.org/tsg_ran/WG2_RL2/TSGR2_107bis/Docs/R2-1912948.zip [retrieved on Oct. 4, 2019] section 2, first paragraph; figure 1.

International Search Report and Written Opinion—PCT/US2021/031129—ISA/EPO—Sep. 3, 2021.

* cited by examiner

DYNAMIC SLOT AGGREGATION INDICATION FOR RANDOM ACCESS PROCEDURE

CROSS-REFERENCE TO RELATED APPLICATION

The present application claims the benefit of U.S. Provisional Patent Application No. 63/021,017, filed on May 6, 2020, and titled "DYNAMIC SLOT AGGREGATION INDICATION FOR RANDOM ACCESS PROCEDURE," the disclosure of which is expressly incorporated by reference in its entirety.

TECHNICAL FIELD

This disclosure relates generally to wireless communication, and specifically, to dynamically indicating repetition configurations for random access procedure messages.

DESCRIPTION OF RELATED TECHNOLOGY

Wireless communication systems are widely deployed to provide various telecommunications services such as telephony, video, data, messaging, and broadcasts. Typical wireless communication systems may employ multiple-access technologies capable of supporting communications with multiple users by sharing available system resources (for example, bandwidth, transmit power, or the like). Multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In various wireless communication systems, including 5G new radio (NR) systems, a user equipment (UE) may perform a random access procedure for various reasons including, for example, initial access to a network, transitioning from an inactive or idle radio resource control (RRC) state to a connected RRC state, performing handover from a source cell to a target cell, for beam failure recovery, for uplink timing recovery, or for small uplink data transmissions. Some random access procedure message transmissions may have limited coverage. In some examples, a random access procedure message transmitted from a reduced-capability UE may have limited coverage due to the UE's reduced transmission power. In some such examples, coverage of the reduced-capability UE may be decreased as a result of a reduced number of antennas (for example, a single antenna) or use of high-frequency bands (for example, above 24 GHz bands). In some examples, one or more random access procedure messages, such as messages transmitted on a physical uplink shared channel (PUSCH), may be repeated or aggregated to address coverage issues.

SUMMARY

In one aspect of the present disclosure, a method for wireless communication performed by a user equipment (UE) includes transmitting, to a base station, a random access preamble to initiate a random access procedure. The method further includes receiving, from the base station based on transmitting the random access preamble, a downlink message comprising a repetition number indicator. The method still further includes transmitting a number of repetitions of a physical uplink channel based on the repetition number indicator.

Another aspect of the present disclosure is directed to an apparatus for wireless transmission at the UE. The apparatus includes means for transmitting, to a base station, a random access preamble to initiate a random access procedure. The apparatus further includes means for receiving, from the base station based on transmitting the random access preamble, a downlink message comprising a repetition number indicator. The apparatus still further includes means for transmitting a number of repetitions of a physical uplink channel based on the repetition number indicator.

In another aspect of the present disclosure, a non-transitory computer-readable medium with non-transitory program code recorded thereon for wireless transmission at the UE is disclosed. The program code is executed by a processor and includes program code to transmit, to a base station, a random access preamble to initiate a random access procedure. The program code further includes program code to receive, from the base station based on transmitting the random access preamble, a downlink message comprising a repetition number indicator. The program code still further includes program code to transmit a number of repetitions of a physical uplink channel based on the repetition number indicator.

Another aspect of the present disclosure is directed to an apparatus for wireless communication at a UE, the apparatus includes a processor, and a memory communicatively coupled with the processor and storing instructions that, when executed by the processor, cause the apparatus to transmit, to a base station, a random access preamble to initiate a random access procedure. Execution of the instructions also cause the apparatus to receive, from the base station based on transmitting the random access preamble, a downlink message comprising a repetition number indicator. Execution of the instructions further cause the apparatus to transmit a number of repetitions of a physical uplink channel based on the repetition number indicator.

In one aspect of the present disclosure, a method for wireless communication performed by a base station includes receiving, from a UE, a random access preamble to initiate a random access procedure. The method further includes transmitting, to the UE based on receiving the random access preamble, a downlink message comprising a repetition number indicator. The method still further includes receiving a number of repetitions of a physical uplink channel based on the repetition quantity indicator.

Another aspect of the present disclosure is directed to an apparatus for wireless communication performed at a base station. The apparatus includes means for receiving, from a UE, a random access preamble to initiate a random access procedure. The apparatus further includes means for transmitting, to the UE based on receiving the random access preamble, a downlink message comprising a repetition number indicator. The apparatus still further includes means for receiving a number of repetitions of a physical uplink channel based on the repetition quantity indicator.

In another aspect of the present disclosure, a non-transitory computer-readable medium with non-transitory program code recorded thereon for wireless communication performed at a base station is disclosed. The program code is executed by a processor and includes program code to receive, from a UE, a random access preamble to initiate a random access procedure. The program code further includes program code to transmit, to the UE based on receiving the random access preamble, a downlink message comprising a repetition number indicator. The program code still further includes program code to receive a number of repetitions of a physical uplink channel based on the repetition quantity indicator.

Another aspect of the present disclosure is directed to an apparatus for wireless communication at a base station, the apparatus includes a processor, and a memory communicatively coupled with the processor and storing instructions that, when executed by the processor, cause the apparatus to receive, from a UE, a random access preamble to initiate a random access procedure. Execution of the instructions also cause the apparatus to transmit, to the UE based on receiving the random access preamble, a downlink message comprising a repetition number indicator. Execution of the instructions further cause the apparatus to receive a number of repetitions of a physical uplink channel based on the repetition quantity indicator.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only some aspects of this disclosure and are therefore not to be considered limiting of its scope, for the description may admit to other equally effective aspects. The same reference numbers in different drawings may identify the same or similar elements.

DETAILED DESCRIPTION

Figure 1:
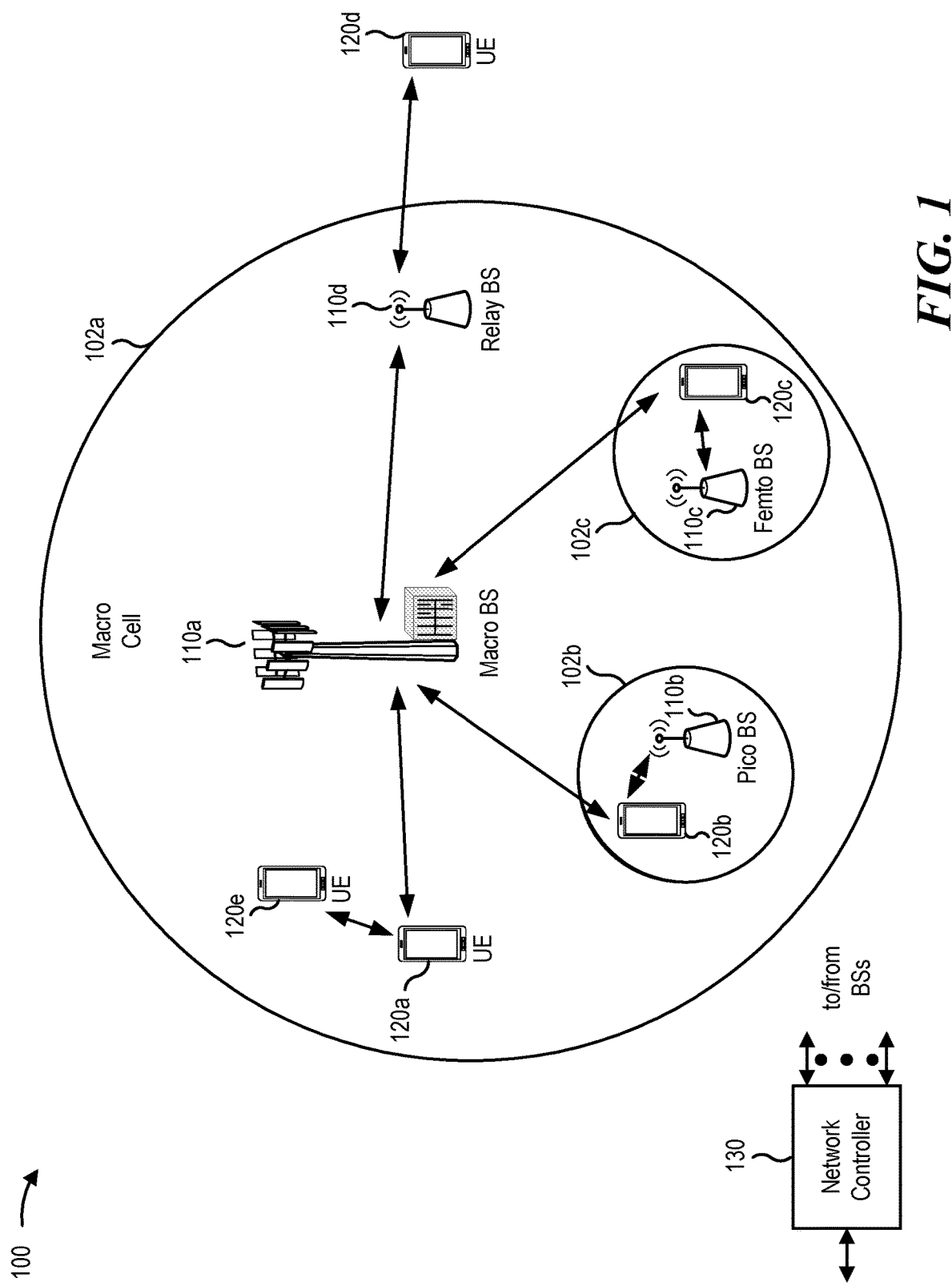
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to a person having ordinary skill in the art. Based on the teachings, a person having ordinary skill in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G or 4G technologies.

In various wireless communication systems, including 5G new radio (NR) systems, a user equipment (UE) may perform a random access procedure for various reasons including, for example, initial access to a network, transitioning from an inactive or idle radio resource control (RRC) state to a connected RRC state, performing handover from a source cell to a target cell, for beam failure recovery, for uplink timing recovery, or for small uplink data transmissions. In some examples, physical uplink channel transmissions, such as physical uplink shared channel transmissions, may have limited coverage. In some examples, a physical uplink channel transmission from a reduced-capability UE may have limited coverage due to the UE's reduced transmission power. In some such examples, coverage of the reduced-capability UE may be decreased as a result of a reduced number of antennas (for example, a single antenna) or use of high-frequency bands (for example, above 24 GHz bands). In the current disclosure, a random access procedure message transmission may be an example of a physical uplink channel transmission.

In some examples, physical uplink channel transmissions may be repeated or aggregated over multiple slots to address the described coverage issues. Still, in some such examples, collisions may result when the aggregated slots or message repetitions overlap with other previously scheduled events. Examples of conflicting scheduled events may include a downlink measurement event where the UE is scheduled to measure downlink signals. It may be desirable to dynamically address the limited coverage issues to reduce collisions.

Aspects of the present disclosure generally relate to extending the coverage of messages carried in a physical uplink channel, such as a physical uplink shared channel (PUSCH). Various aspects more specifically relate to extending the coverage of a third message (for example, Msg3) in a four-step random access procedure. The third message may include one or more of a connection request message, a scheduling request message, or a buffer status message. Particular aspects relate to dynamically indicating a number of repetitions of a physical uplink channel via a downlink message. In some implementations, a UE transmits a random access preamble to a base station to initiate a random access procedure. In some examples, the random access preamble may be a first message (for example, Msg1) in the four-step random access procedure. In such examples, the UE may receive the downlink message based on the transmitted random access preamble. In some examples, the downlink message may be an uplink scheduling message. As an example, the uplink scheduling message may be a random access response (RAR) message that includes an uplink grant. In some such examples, the uplink scheduling message may be a second message (for example, Msg2) in the four-step random access procedure. In some examples, the UE may perform an initial physical uplink channel transmission based on the received uplink grant. In some such examples, the initial physical uplink channel transmission may be an initial PUSCH Msg3 transmission of the four-step random access procedure. In some other examples, the downlink message may be downlink control information (DCI). The DCI may be received after the initial physical uplink channel transmission.

In some implementations, the UE may repeat the physical uplink channel transmission based on a repetition number indicator included in the downlink message. In some examples, the repetition number indicator corresponds to time domain resource allocation (TDRA) in the uplink scheduling message. In such examples, the number of repetitions may be based on a repetition number associated with the TDRA. In other such examples, the number of repetitions may be based on a value of a transmission power control (TPC) command field when the TDRA is not associated with the repetition number. In some other examples, the repetition number indicator is associated with one or both of a new data indicator field of the DCI or a hybrid automatic repeat request (HARQ) process number field of the DCI. In such examples, the number of repetitions may be based one or both of a value of the new data indicator field or a value of the HARQ process number field respectively associated with the repetition number indicator. In some other examples, the repetition number indicator corresponds to a TDRA in scheduling information of the DCI. The scheduling information may schedule a retransmission of the physical uplink channel. In some such examples, the number of repetitions is based on a repetition number associated with the TDRA. In other such examples, the number of repetitions is based on one or both of a new data indicator field of the DCI or a HARQ process number field of the DCI when the TDRA is not associated with the repetition number.

Particular aspects of the subject matter improve coverage in a random access procedure by repeating random access procedure message transmissions. In some such aspects, such repetitions may also improve coverage of the random access procedure messages, thereby increasing a likelihood of a successful reception for one or more of the random access procedure messages. The increase in the likelihood of the successful reception may also decrease latency in the random access procedure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with UEs and may also be referred to as a base station, a NR BS, a Node B, a gNB, a 5G node B (NB), an access point, a transmit and receive point (TRP), or the like. Each BS may provide communications coverage for a particular geographic area. In 3GPP, the term "cell" can refer to a coverage area of a BS or a BS subsystem serving this coverage area, depending on the context in which the term is used.

A BS may provide communications coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, or the like.

The wireless network 100 may be a heterogeneous network that includes BSs of different types, for example, macro BSs, pico BSs, femto BSs, relay BSs, or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs may also communicate with one another, for example, directly or indirectly via a wireless or wireline backhaul.

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a customer premises equipment (CPE). UE 120 may be included inside a housing that houses components of UE 120, such as processor components, memory components, or the like.

In general, any number of wireless networks may be deployed in a given geographic area. Each wireless network may support a particular radio access technology (RAT) and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like), a mesh network, or the like. In this case, the UE 120 may perform scheduling operations, resource selection operations, or other operations described elsewhere as being performed by the base station 110.

Figure 2:
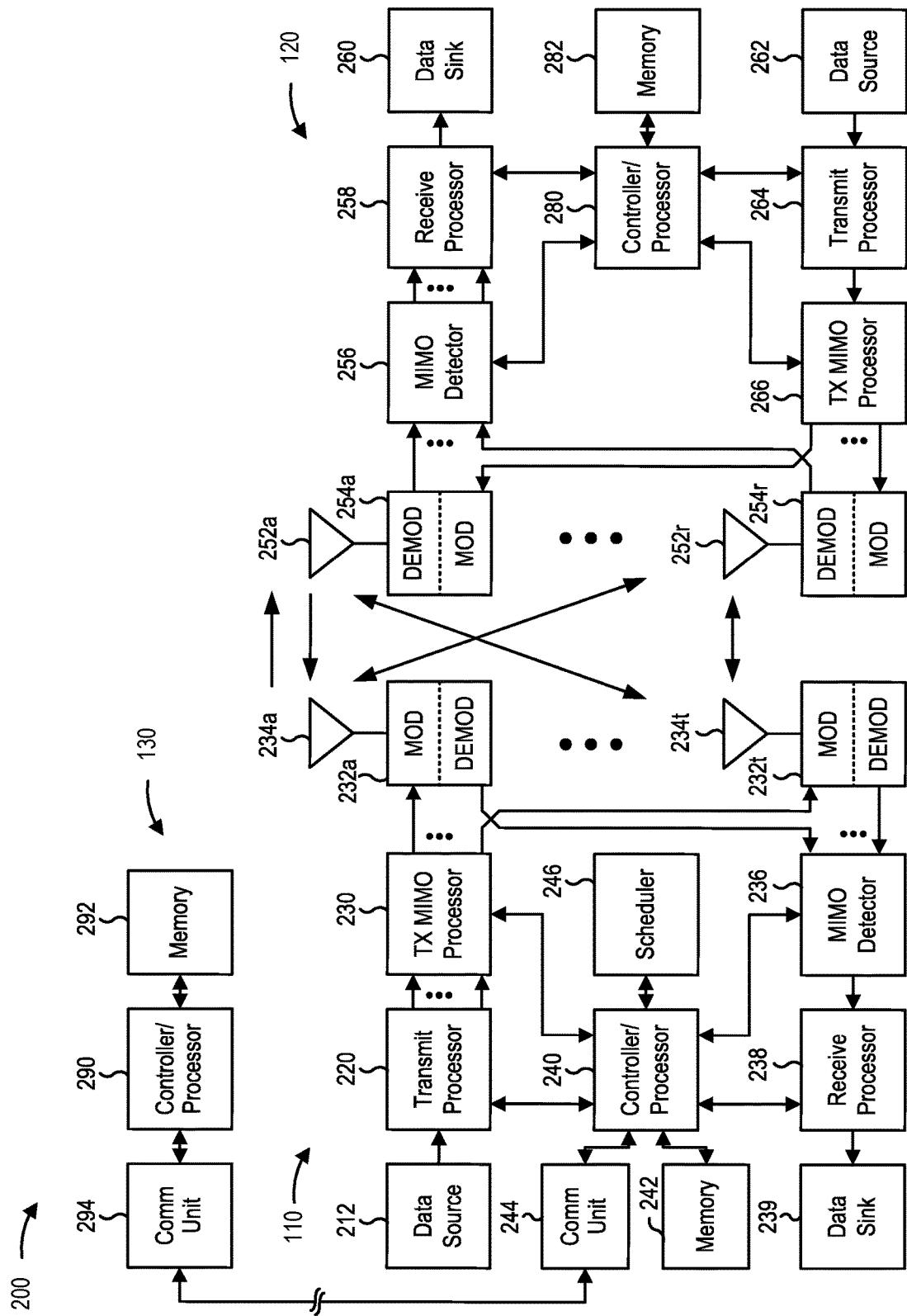
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 may also process system information (for example, for semi-static resource partitioning information (SRPI) or the like) and control information (for example, CQI requests, grants, upper layer signaling, or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), or the like. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, or any other component(s) of FIG. 2 may perform one or more techniques associated with dynamic slot aggregation configurations, as described in more detail elsewhere. For example, the controller/processor 240 of the base station 110, the controller/processor 280 of the UE 120, or any other component(s) of FIG. 2 may perform or direct operations of, for example, the processes of FIGS. 8-9 and 11 or other processes as described. Memories 242 and 282 may store data and program codes for the base station 110 and UE 120, respectively. A scheduler 246 may schedule UEs for data transmission on the downlink or uplink.

In various deployments of wireless communications, including 5G new radio (NR), for example, a UE may perform random access procedures under some conditions. Random access procedures may be employed for initial access to a network, when transitioning from an inactive or idle radio resource control (RRC) state to a connected RRC state, when performing handover from a source cell to a target cell, for beam failure recovery, for uplink timing recovery, or for small uplink data transmissions. In some instances, the random access procedure may be a four-step random access procedure. In other instances, the random access procedure may be a two-step random access procedure.

The four-step procedure involves the UE transmitting a first message (Msg1) including a physical random access channel (PRACH) preamble and receiving a second message (Msg2) including a RAR that includes scheduling information for a PUSCH transmission. The procedure also includes transmitting a third message (Msg3) including the PUSCH transmission, and receiving a fourth message (Msg4) including a contention resolution message on the physical downlink control channel (PDCCH) or physical downlink shared channel (PDSCH).

The two-step procedure involves transmitting a first message (MsgA) including a physical random access channel (PRACH) preamble and the Msg3 content. The two-step procedure also includes transmitting a second message (MsgB) carrying the equivalents of Msg2 and Msg4 of the four-step procedure.

In some deployments, in order to increase coverage and reliability, coverage enhancement techniques are applied to some transmissions, including Msg3 or MsgA PUSCH transmissions. The coverage enhancement techniques may include repetition of a transmission for coverage extension or slot aggregation for the transmission for coverage extension. In some instances, reduced-capability UEs may generally specify more coverage enhancement support due to lower transmission power of the reduced-capability UEs. For example, reduced-capability UEs may have a transmission power that is a few dB lower than the transmission power of an enhanced mobile broadband/ultra reliability low latency communication (eMBB/URLLC) UE. Further, reduced-capability UEs may have a small number of antennas (for example, a single antenna), which further results in reduced coverage. Even for eMBB/URLLC UEs, Msg3 or MsgA PUSCH transmissions at high frequency bands (for example, above 24 GHz bands) may have less coverage and could benefit from coverage extension. In other examples, Msg3 or MsgA PUSCH transmissions may transmit small amounts of uplink data during RRC Inactive or Idle states. In such examples, coverage enhancement for the Msg3 or MsgA PUSCH transmission may increase reliability of the uplink data transmission.

Enabling slot aggregation or repetition for Msg3 or MsgA PUSCH transmission may occur to increase coverage extension during random access procedures. A UE may repeat a particular transport block of a Msg3 or MsgA PUSCH transmission across a number of consecutive slots or the UE may encode the transport block at a lower coding rate for transmission over the aggregated slots. In some instances, the UE may use the same symbol allocation in each slot when repeating the Msg3 or MsgA PUSCH transmission. The UE may apply slot aggregation or repetition to only Msg3 or MsgA PUSCH retransmissions, in some examples, or to both initial transmissions as well as retransmissions. In some instances, various rules or UE behavior actions may be specified to address situations where a random access repetition collides with a previously scheduled event, such as a downlink measurement event, or a preconfigured transmission on a resource that overlaps with the random access repetition.

As described above, in some examples, random access procedure message transmissions may be repeated or aggregated over multiple slots to address the described coverage issues. Still, in some such examples, collisions may result when the aggregated slots or message repetitions overlap with other previously scheduled events. Examples of conflicting scheduled events may include a downlink measurement event where the UE is scheduled to measure downlink signals. It may be desirable to dynamically address the limited coverage issues to reduce collisions.

Aspects of the present disclosure generally relate to extending the coverage of messages carried in a physical uplink channel, such as the PUSCH. Various aspects more specifically relate to extending the coverage of a third message (for example, Msg3) in a four-step random access procedure by dynamically indicating a number of repetitions for transmissions of the third message. The number of repetitions may be dynamically indicated via a downlink message, such as a random access response message or DCI. Aspects of the present disclosure are not limited to extending coverage of the third message. Additionally, or alternatively, the messages with limited coverage may include a message A (MsgA) in a two-step random access procedure. In some implementations, coverage may be extended for message A transmissions.

Figure 3:
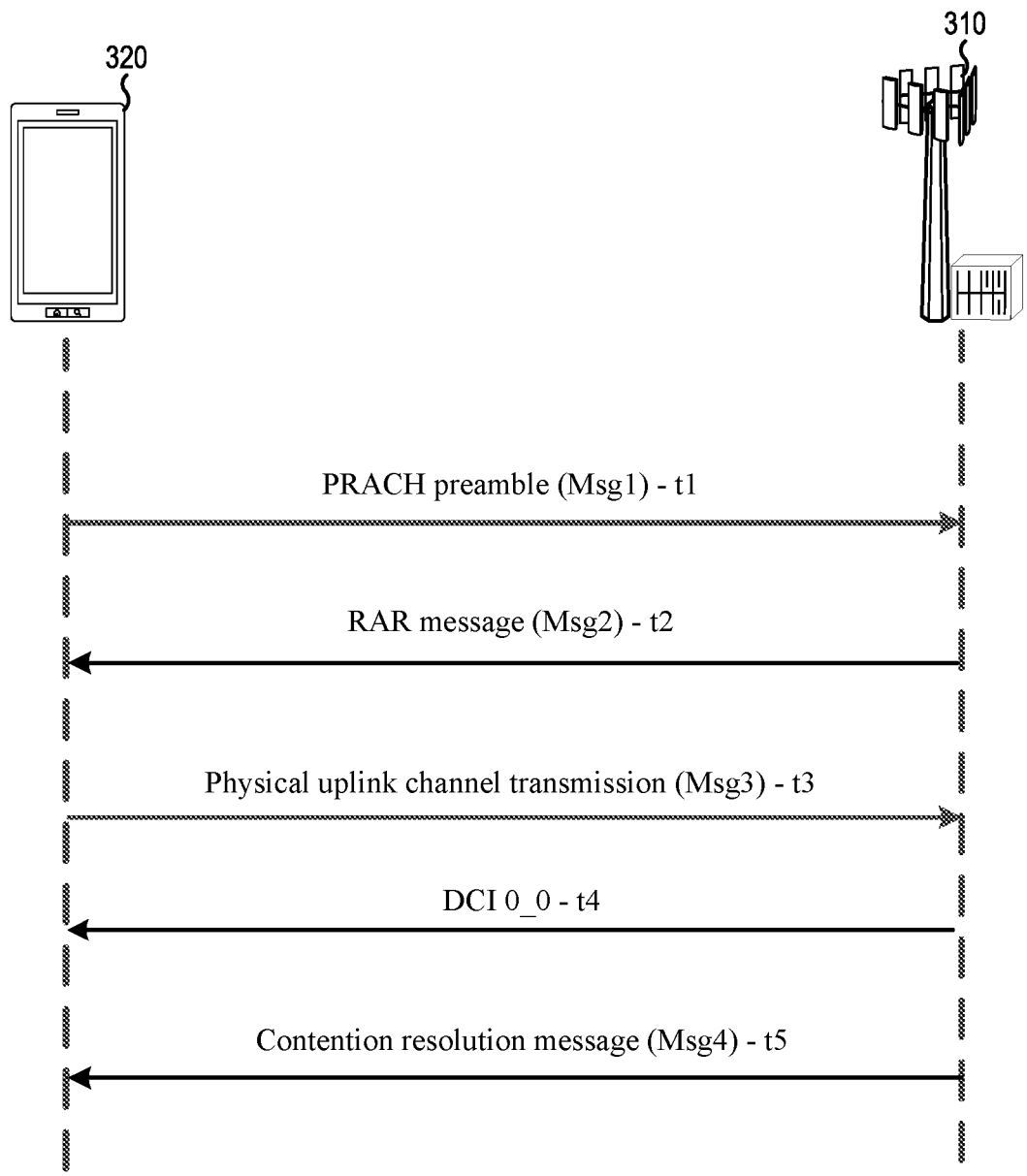
FIG. 3 is a timing diagram illustrating an example of a four-step random access procedure, in accordance with aspects of the present disclosure.

FIG. 3 is a timing diagram illustrating an example 300 of a four-step random access procedure, in accordance with aspects of the present disclosure. In the example of FIG. 3, a UE 320 and a base station 310 may be devices of a wireless communication system, such as the wireless communication system 100 of FIG. 1. The UE 320 may be an example of the UE 120 described with reference to FIG. 1. Additionally, the base station 310 may be an example of the base station 110 described with reference to FIG. 1.

In some examples, as shown in FIG. 3, at time t1, the UE 320 may transmit a PRACH preamble on a PRACH to the base station 310. The PRACH preamble may initiate a random access procedure with the base station 310. In such examples, the PRACH preamble may be an example of the first message (for example, Msg1) of the four-step random access procedure. In such examples, the PRACH preamble may include timing information for uplink transmissions that allow the base station 310 to set timing advance parameters, for example.

As shown in FIG. 3, at time t2, the UE 320 receives a RAR message from the base station 310. The RAR message may be an example of the second message (for example, Msg2) of the four-step random access procedure. The RAR message may include timing advance parameters, an uplink grant for a random access procedure message transmission (for example, a Msg3 transmission), or a temporary cell radio network temporary identifier (TC-RNTI). In some instances, the base station 310 may transmit the TC-RNTI to indicate the scrambling sequence used for a fourth message (for example, Msg4) of the four-step random access procedure transmission. The scrambling sequence enables the base station 310 to simultaneously communicate with multiple UEs. Each UE may have its own scrambling sequence. The base station 310 may separate the signals from the different UEs based on the respective scrambling sequences.

In some examples, the RAR message may be transmitted on a PDSCH. Although not shown in FIG. 3, in some examples, prior to time t2, the UE 320 may decode a PDCCH to obtain the DCI containing scheduling information for the PDSCH carrying the RAR message. The UE 320 may receive the PDSCH based on the scheduling information included in the DCI. DCI may have different predefined formats to define how data is packed within the DCI. In some examples, the DCI may be format 1_0 with a CRC scrambled by a random RA-RNTI.

In some examples, after receiving the RAR message, the UE 320 transmits a random access procedure message on an uplink shared channel, such as a PUSCH, at time t3. The random access procedure message may be an example of the third message (for example, Msg3) of the four-step random access procedure. Specifically, the random access procedure messages may be an example of a physical uplink channel transmission, such as a PUSCH Msg3 transmission. The random access procedure message may be transmitted using resources scheduled by the uplink grant included in the RAR message. In some examples, the random access procedure message may include an RRC connection request, a scheduling request, or a buffer status.

As described, due to poor channel conditions or other factors, a physical uplink channel transmission, such as a random access procedure message transmission on the PUSCH may be retransmitted. In some examples, the base station 310 may fail to receive or decode the random access procedure message due to the poor channel conditions. In some examples, a DCI message received at time t4 may schedule retransmissions of the random access procedure message. In such examples, the DCI may have format 0_0, with the DCI CRC scrambled by the TC-RNTI provided in the RAR message of time t2. Additionally, as shown in FIG. 3, the base station 310 may transmit a contention resolution message at time t5. The contention resolution message may be an example of a fourth message (for example, Msg4) of the four-step random access procedure. In some examples, the contention resolution message may be received at the UE 320 on the PDCCH or PDSCH. Additionally, the base station 310 may transmit the contention resolution message on time and frequency resources indicated in the DCI 1_0 received prior to time t2.

The RACH procedure depicted in FIG. 3 may be performed in various use cases, including for initial access to a network or cell, when a UE 320 transitions from an RRC Idle/Inactive state to an RRC Connected state (for example, after receiving a paging message), when beam recovery or uplink timing recovery is desired, or when a UE 320 is changing serving base stations 310 during a handover procedure. Further, in some instances, a UE 320 may use the RACH procedure described above to transmit small uplink data transmissions during RRC Idle/Inactive states in order to save on the overhead costs of leaving RRC Idle/Inactive states into RRC Connected state just to transmit a relatively small amount of data.

Figure 4:
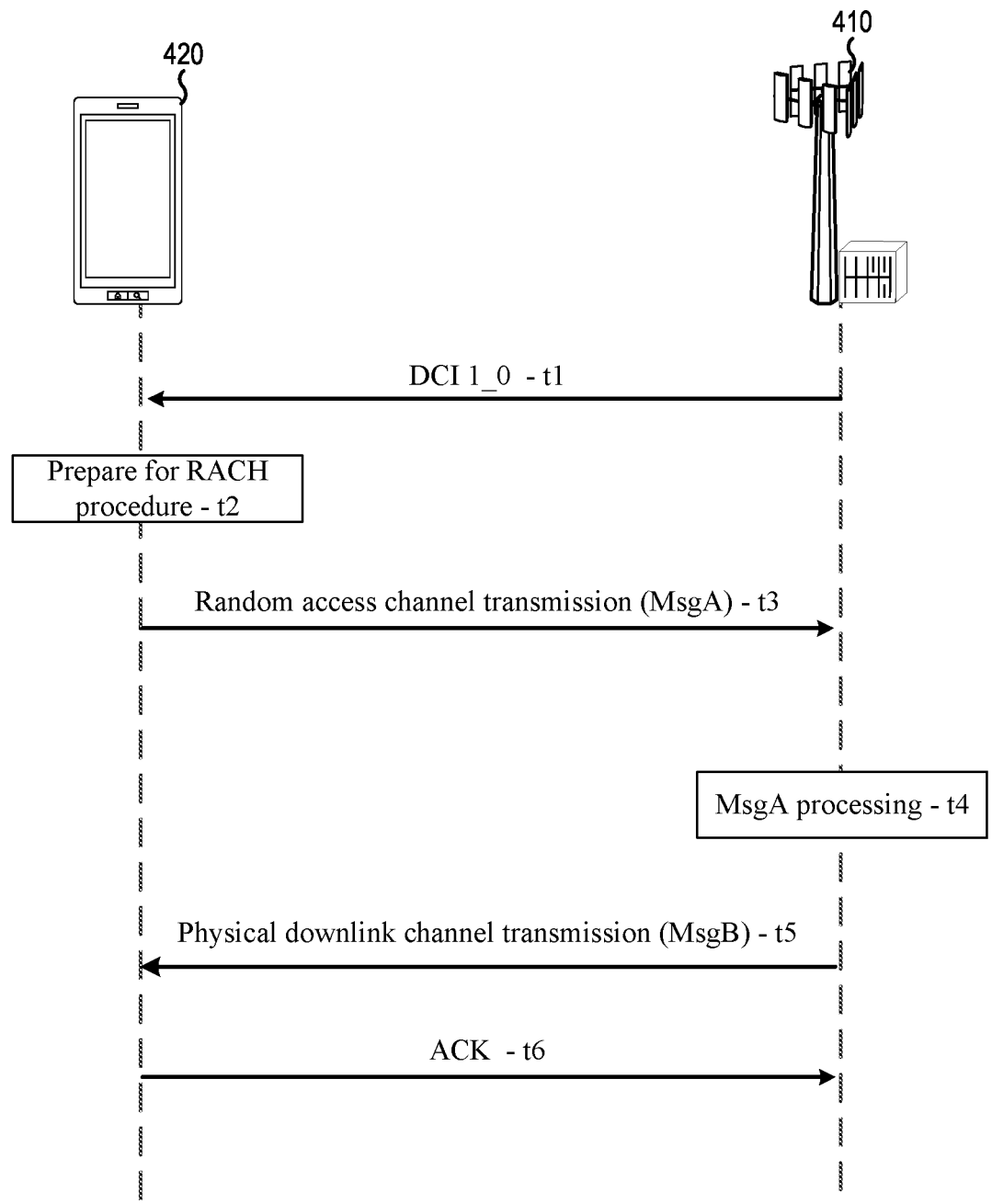
FIG. 4 is a timing diagram illustrating an example of a two-step random access procedure, in accordance with aspects of the present disclosure.

As described, aspects of the present disclosure are not limited to extending coverage of the third message. In some examples, the messages with limited coverage may include a message A (MsgA) in a two-step random access procedure. In some implementations, coverage may be extended for message A transmissions. FIG. 4 is a timing diagram illustrating an example 400 of a two-step random access procedure, in accordance with aspects of the present disclosure. In the example of FIG. 4, a UE 420 and a base station 410 may be devices of a wireless communication system, such as the wireless communication system 100 of FIG. 1. The UE 420 may be an example of the UE 120 described with reference to FIG. 1. Additionally, the base station 410 may be an example of the base station 110 described with reference to FIG. 1.

As shown in FIG. 4, prior to initializing the two-step RACH procedure, the UE 420 receives a synchronization signal block (SSB), a system information block (SIB), reference signals (RSs), and RRC signaling, at time t1, to enable the RACH procedure. At time t2, the UE 420 may perform DL synchronization, system information (SI) decoding, and reference signal measurement to prepare for the RACH procedure. Additionally, at time t3, the UE 420 transmits a random access procedure message on the PRACH. The random access procedure message may be an example of message A (for example, MsgA) of the two-step RACH procedure. In some examples, the random access procedure message transmission may include two transmissions. A first transmission on a PRACH may include a PRACH preamble, which may include timing information for the base station 410 to set timing advance parameters for uplink transmissions from the UE 420. The second transmission on a PUSCH may include a payload of a random access procedure message (for example, Msg3) as described above with reference to FIG. 3.

In response to receiving MsgA, the base station 410 processes the preamble and the payload at time t4. Additionally, at time t5, the base station 410 transmits a RAR message. The RAR message may be an example of message B (for example, MsgB) of the two-step RACH procedure. In some examples, the RAR message transmission may include two transmissions. The first transmission may be on the PDCCH and the second transmission may be on the PDSCH. The content of the RAR message may include the information equivalent to the RAR message (for example, Msg2) and the contention resolution message (for example, Msg4) as described in FIG. 3 for the four-step procedure. Upon successfully receiving the RAR message from the base station 410, the UE 420 transmits a HARQ acknowledgment (ACK) on a physical uplink control channel (PUCCH) at time t6.

The RACH procedure depicted in FIG. 4 may be performed in various use cases, including for initial access to a network or cell, when a UE 420 transitions from an RRC Idle/Inactive state to an RRC Connected state (for example, after receiving a paging message), when beam recovery or uplink timing recovery is desired, or when a UE 420 is changing serving base stations 410 during a handover procedure. Further, in some instances, a UE 420 may use the RACH procedure described above to transmit small uplink data transmissions during RRC Idle/Inactive states in order to save on the overhead costs of leaving RRC Idle/Inactive states into RRC Connected state just to transmit a relatively small amount of data.

In some examples, an initial transmission or retransmission of a random access procedure message (for example, Msg3 or MsgA) may be repeated over multiple aggregated slots to extend coverage. In some such examples, the random access procedure message may be repeated over the slots where a redundancy version (RV) for the repeated random access procedure message in each slot may be the same or different. As another example, the random access procedure message may be encoded at a low coding rate for transmission over the resources in the slots. The configuration of aggregated slots or a number of repetitions may be fixed or dynamic. In some such examples, the fixed indication may be transmitted to the UE via system information (SI) or a RAR message. In other such examples, a dynamic indication may be transmitted to the UE via the RAR message or DCI. In some examples, a dynamic indication may be more efficient than a fixed indication because the number of repetitions or the slot aggregation configuration may be adaptively adjusted. The adjustments may be based on UE geometry or latency of the RACH procedure. In some examples, an increase in a number of repetitions may increase a likelihood of a successful transmission, thereby reducing a number of retransmissions and increasing latency of a random access procedure. In some other examples, with respect to UE geometry, fewer repetitions may be specified if the UE is closer to the cell center because the close distance may increase a likelihood of a successful transmission.

In some other examples, one or more physical uplink channel transmissions, such as random access procedure message transmissions, may be repeated over the aggregated slots may overlap or collide with one or more previously scheduled events or transmissions. Examples of such scheduled events may include a downlink measurement event where the UE is scheduled to measure downlink signals. In other examples, a collision may occur when the same resources in a slot are scheduled for other transmissions or monitoring occasions (for example, a RACH occasion or PUSCH resource unit of a two-step RACH procedure). To address collisions, the slot aggregation configuration may dynamically indicate a number of slots to be aggregated, a number of repetitions, and the RV configuration for repeated transmission. In some examples, the slot aggregation configuration may include information for resolving a collision of a random access procedure message with another uplink transmission or a downlink reception. For example, the slot aggregation configuration may include priority rules for the UE to avoid collisions.

Some aspects of the present disclosure relate to dynamically indicating a number of repetitions for a physical uplink channel transmission, such as a PUSCH Msg3 transmission, to the UE via a downlink message, such as DCI or a RAR message, of a four-step RACH procedure. Other aspects of the present disclosure relate to dynamically indicating a number of repetitions for a physical uplink channel transmission, such as a PUSCH Msg3 transmission, to the UE via a downlink message, such as DCI or a RAR message, of a two-step RACH procedure. Additionally, some aspects of the present disclosure relate to dynamically indicating a slot aggregation configuration for a physical uplink channel transmission, such as a PUSCH Msg3 transmission, to the UE via a downlink message in a four-step RACH procedure or a two-step RACH procedure.

As described above, DCI 1_0 may schedule an initial random access procedure message transmission. In some implementations, the base station schedules random access procedure message retransmissions with DCI 0_0. In such implementations, the DCI 0_0 may have a CRC scrambled by a TC-RNTI. RV cycling may occur between retransmissions. In some such implementations, the DCI 0_0 may include a new data indicator field (for example, one reserved bit) and a HARQ process number field (for example, four reserved bits). In some examples, one or more of these fields or other fields (for example, other reserved fields) may be reused or repurposed in the DCI 0_0 to indicate a number of repetitions for a random access procedure message. In some implementations, the number of repetitions may be specified for an initial random access procedure message or a number of repetitions for a retransmission of the random access procedure message. The repetition configuration may be an example of a repetition number indicator.

In some other implementations, a repetition number indicator may be associated with one or more reserved bits of DCI 0_0. The reserved bits may be bits of a new data indicator field or a HARQ process number field. The number of repetitions of a physical uplink channel, such as a PUSCH Msg3 retransmission, may be based on one or both of a value of the new data indicator field or a value of the HARQ process number field respectively associated with the repetition number indicator. In such implementations, a CRC of DCI 0_0 may be scrambled by the TC-RNTI. In some other implementations, the repetition number indicator may be associated with TDRA included in scheduling information of the DCI. In some examples, the scheduling information may schedule retransmission of the physical uplink channel. The base station may transmit a TDRA table to the UE via RRC signaling. The TDRA table may be an example of a pusch-TimeDomainAllocationList-r17. In some examples, the TDRA may be associated with an entry, such as a row, in the TDRA table. In some such examples, the entry in the TDRA may indicate one or more of a repetition number, a slot (K2) for the physical uplink channel transmission, a starting symbol indicator (S) relative to the slot, and a length indicator (L) identifying a number of consecutive symbols for the physical uplink channel transmission. In such examples, the TDRA may be associated with the repetition number, such that number of repetitions for the physical uplink channel, such as a PUSCH Msg3 retransmission, may be determined from a value of the repetition number. In some such implementations, the TDRA may not be associated with the repetition number. In such implementations, the UE may use a Default A table or an existing TDRA table to obtain the slot (K2), the staring symbol indicator (S), and the length indicator (L). Additionally, the number of repetitions may be based on one or both of new data indicator field or the HARQ process number field.

As described, a downlink message, such as DCI, may include a repetition number indicator. The downlink message may be received during a four-step RACH procedure or a two-step RACH procedure. In some implementations, the downlink message is an uplink scheduling message transmitted by a base station in response to a random access preamble transmitted by a UE to the base station to initiate a random access procedure. In some examples, the uplink scheduling message is a RAR message. In such implementations, the repetition number indicator corresponds to TDRA in the uplink scheduling message. In some examples, the TDRA may be associated with an entry of a TDRA table. In some such examples, the entry may indicate one or more of a repetition number, a slot (K2) for the physical uplink channel transmission, a starting symbol indicator (S) relative to the slot, and a length indicator (L) identifying a number of consecutive symbols for the physical uplink channel transmission. In such examples, a number of repetitions for a physical uplink channel, such as an initial PUSCH Msg3 transmission, may be determined from repetition number associated with the TDRA. In some implementations, the TDRA may not be associated with a repetition number. In such implementations, the UE may use a Default A table or an existing TDRA table to obtain the slot (K2), the staring symbol indicator (S), and the length indicator (L). Additionally, the number of repetitions may be based on a value of a transmission power control (TPC) command field based on the TDRA being unassociated with the repetition number. As described, the UE may repeat the physical uplink channel transmission based on the determined number of repetitions. The physical uplink channel transmission may include one or more of a connection request message, a scheduling request message, or a buffer status message. In some examples, the physical uplink channel is a PUSCH.

In some examples, a number of repetitions for an initial physical uplink channel may be the same or different from a number of repetitions for a retransmission of the physical uplink channel (for example, subsequent transmission of the physical uplink channel). Additionally, or alternatively, a number of repetitions for a first retransmission of the physical uplink channel may be the same or different from a number of repetitions for a second retransmission of the physical uplink channel (for example, subsequent retransmission of the physical uplink channel).

In some examples, an indicated slot aggregation configuration for one random access procedure message retransmission may be the same as the slot aggregation configuration for another random access procedure message retransmission. In other examples, the number of aggregated slots for one random access procedure message retransmission may be different than that for another random access procedure message retransmission. In some examples, an indicated number of repetitions for one random access procedure message retransmission may be the same as the number of repetitions for another random access procedure message retransmission. In some other examples, an indicated number of repetitions for one random access procedure message retransmission may be different than that for another random access procedure message retransmission. The number of repetitions or the slot aggregation configurations may vary to improve resource usage. In some examples, the varying number of repetitions may improve resource use in a time division duplexed (TDD) system enabling different UE geometry conditions.

In some implementations, a UE transmits a random access procedure message over multiple slots instead of a single slot. Such transmissions may include an initial transmission or a retransmission. In some such implementations, the UE transmits the random access procedure message across multiple slots by repeating the random access procedure message over the slots or encoding the random access procedure message over the slots, such as with a low encoding rate.

Figure 5:
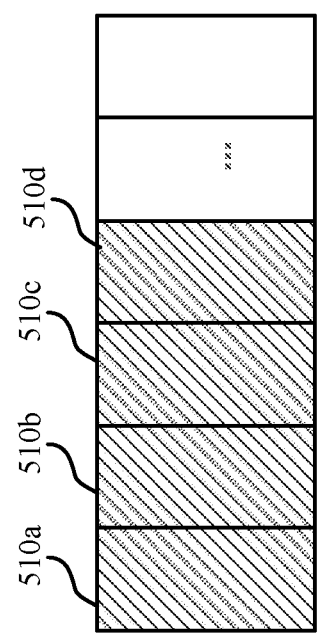
FIG. 5 is a block diagram illustrating an example of a slot aggregation configuration, in accordance with aspects of the present disclosure.

FIG. 5 is a block diagram illustrating an example of a slot aggregation configuration, in accordance with aspects of the present disclosure. In the example shown in FIG. 5, a base station schedules (for example, via a RAR message) a UE for transmission of a random access procedure message on certain uplink shared channel resources during a particular slot 510a. If a slot aggregation configuration so indicates, the UE may transmit the random access procedure message on the scheduled resources in the particular slot 510a as well as on a number of consecutive subsequent slots 510b, 510c, and 510d, as shown in FIG. 5. In some examples, absent the slot aggregation configuration, the UE may be limited to only transmitting certain uplink shared channel resources during the particular slot 510a. In some implementations, the UE may transmit repetitions of the random access procedure message based on an aggregation parameter. For example, the aggregation parameter may comprise a value of four, indicating the UE should repeat a transmission four times in four consecutive slots, as shown in FIG. 5. The example of FIG. 5 may apply to the random access procedure message for the four-step RACH procedure or the two-step RACH procedure.

In some examples, the slot aggregation configuration may indicate a number of slots to be aggregated or a repetition number indicator identifying a number of repetitions for a random access procedure message. Additionally, or alternatively, the slot aggregation configuration may indicate whether a redundancy version in each slot is the same or different. Additionally, or alternatively, the slot aggregation configuration may indicate whether the random access procedure message may be encoded for transmission across all indicated slots. Additionally, or alternatively, the slot aggregation configuration may indicate one or more of a number of slots to be aggregated, a starting slot and an ending slot for aggregation, a number of repetitions in the aggregated slots, or an RV configuration when the message is repeated in the aggregated slots.

Figure 6:
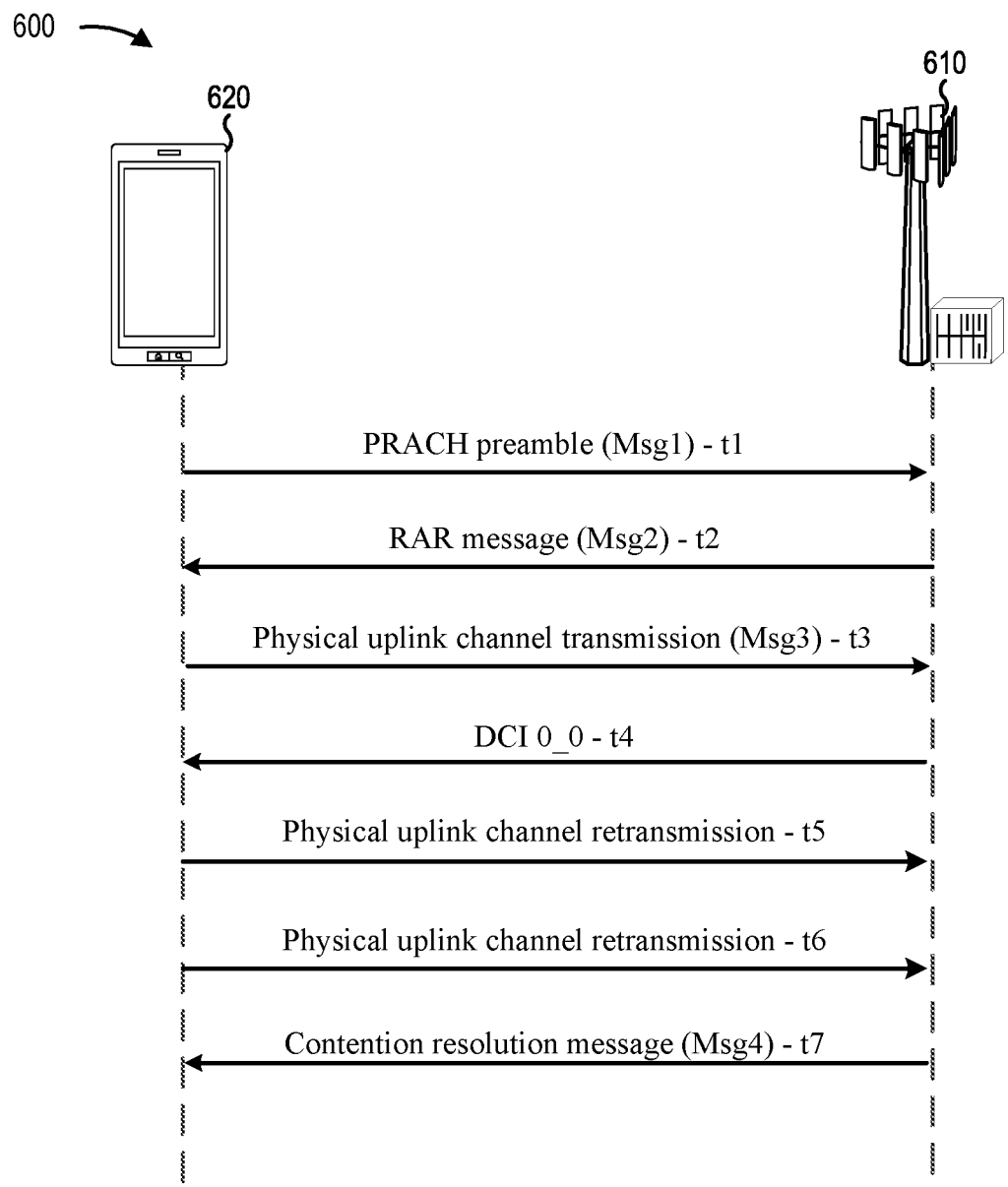
FIG. 6 is a timing diagram illustrating an example of a four-step random access procedure that supports repetition of random access procedure messages, in accordance with various aspects of the present disclosure.

FIG. 6 is a timing diagram 600 illustrating an example of a four-step random access procedure that supports repetition of random access procedure messages, in accordance with various aspects of the present disclosure. In the example of FIG. 6, a UE 620 and a base station 610 may be devices of a wireless communication system, such as the wireless communication system 100 of FIG. 1. The UE 620 may be an example of the UE 120 described with reference to FIG. 1. Additionally, the base station 610 may be an example of the base station 110 described with reference to FIG. 1.

In the example of FIG. 6, the operations of the wireless communication system at times t1, t2, and t3 are the same as described with respect to FIG. 3. For brevity, description of the operations at times t1, t2, and t3 of FIG. 6 is omitted. Still, in the example of FIG. 6, the RAR message (for example, uplink scheduling message) received at time t2 may include a repetition number indicator repetition number indicator corresponding to TDRA in the RAR message. In such examples, as described above, the UE 620 may determine a number of repetitions of an initial transmission of physical uplink channel, such as an initial PUSCH Msg3 transmission at time t3, based on the repetition number indicator. In some such examples, the number of repetitions is based on repetition number associated with the TDRA. As an example, the repetition number may be associated with a column of repetition numbers in the TDRA table. In other such examples, the number of repetitions is based on a value of a TPC command field when the TDRA is not associated with the repetition number.

As shown in FIG. 6, at time t4, the base station 610 transmits DCI 0_0 that includes scheduling information for retransmitting the physical uplink channel transmission of time t3. In some implementations, the DCI 0_0 may include a repetition number indicator (for example, repetition configuration) associated one or more bits of one or more reserved fields, such as a new data indicator field or a HARQ process number field. In some such implementations, the UE 620 may determine the number of repetitions for a retransmission of the physical uplink channel, such as a PUSCH Msg3 retransmission, based on the one or more bits of the one or more reserved field. In other implementations, the repetition indicator of the DCI (for example, DCI 0_0) corresponds to TDRA in the scheduling information of the DCI. In some such implementations, the number of repetitions may be based on a repetition number associated with the TDRA. In other such implementations, the number of repetitions may be based on one or both of a new data indicator field of the DCI or a HARQ process number field of the DCI when the TDRA is not associated with the repetition number. In such implementations, the UE 620 may use a Default A table or an existing TDRA table to determine a slot (K2), a staring symbol indicator (S), and a length indicator (L) for the physical uplink channel retransmission, such as a PUSCH Msg3 retransmission. As described, the number of repetitions may be specified for a retransmission the physical uplink channel transmission at time t3. In the example of FIG. 6, the number of repetitions may be two. Thus, as shown in FIG. 6, the UE 620 transmits to repetitions of the physical uplink channel retransmission, such as a PUSCH Msg3 retransmission, at times t5 and t6, respectively. Additionally, at time t7, the base station 610 transmits the contention resolution message.

Figure 7:
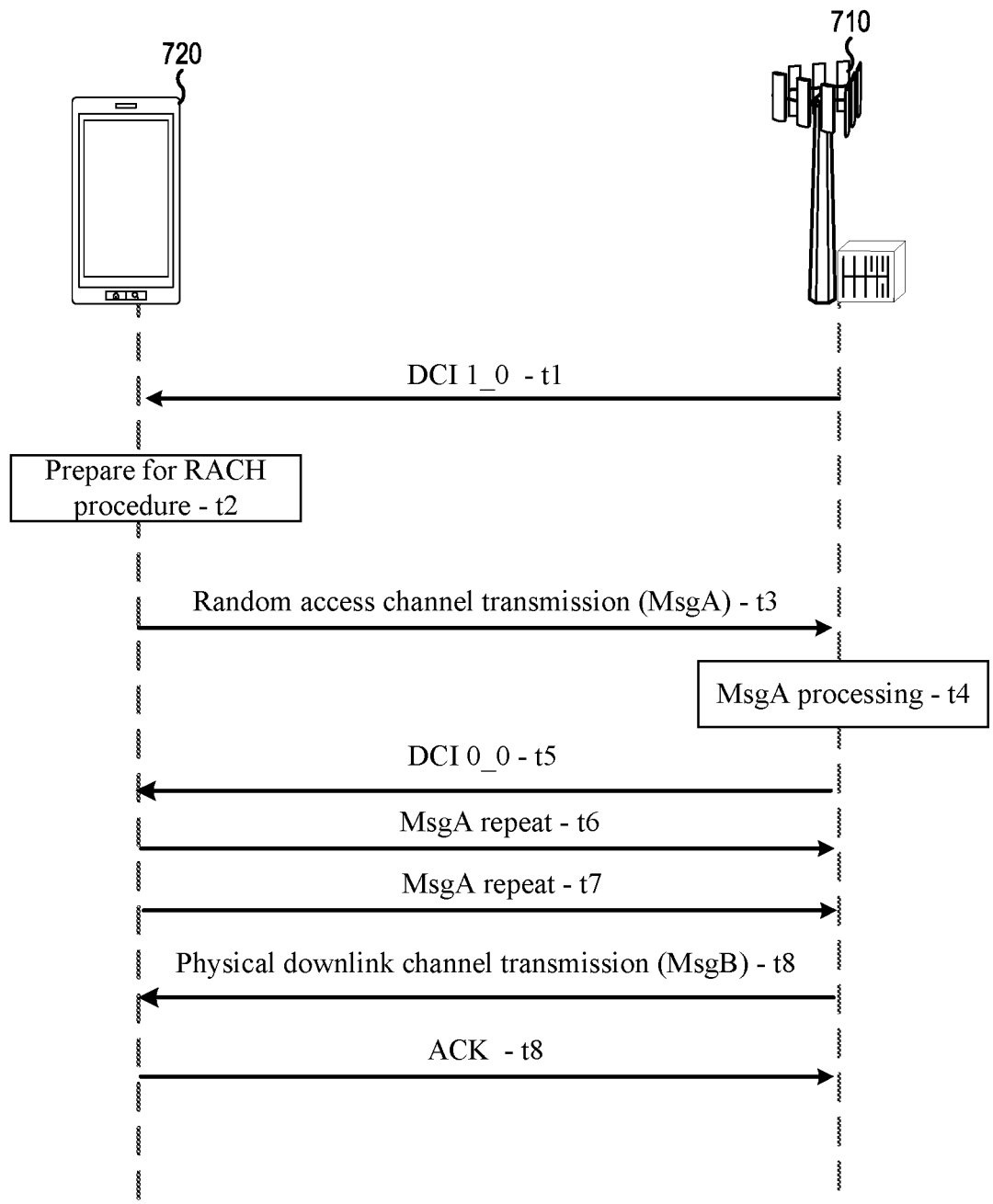
FIG. 7 is a timing diagram illustrating an example of a two-step random access procedure that supports repetition of random access procedure messages, in accordance with various aspects of the present disclosure.

FIG. 7 is a timing diagram 700 illustrating an example of a two-step random access procedure that supports repetition of random access procedure messages, in accordance with various aspects of the present disclosure. In the example of FIG. 7, a UE 720 and a base station 710 may be devices of a wireless communication system, such as the wireless communication system 100 of FIG. 1. The UE 720 may be an example of the UE 120 described with reference to FIG. 1. Additionally, the base station 710 may be an example of the base station 110 described with reference to FIG. 1.

In the example of FIG. 7, the operations of the wireless communication system at times t1, t2, t3, and t4 are the same as described with respect to FIG. 4. For brevity, description of the operations at times t1, t2, t3, and t4 of FIG. 7 is omitted. As shown in FIG. 7, at time t5, the DCI 0_0 may include a slot aggregation configuration indicating a repetition configuration in one of the reserved fields. In response to receiving the repetition configuration, the UE 720 transmits one or more repetitions of the random access procedure message (for example, MsgA) across the slots indicated in the slot aggregation configuration. In the example of FIG. 7, the number of repetitions may be two. Thus, as shown in FIG. 7, a first retransmission of the random access procedure message occurs at time t6 and a second retransmission of the random access procedure message occurs at time t7. As shown in FIG. 7, at time t8, the base station 710 transmits the RAR message. The RAR message may be an example of message B (for example, MsgB) of the two-step RACH procedure. In such examples, the RAR message transmission may include two transmissions. The first transmission may be on the PDCCH and the second transmission may be on the PDSCH. At time t9, the UE 720 transmits a HARQ ACK on a PUCCH in response to receiving the RAR message.

As described above, in some implementations, a UE attempts to detect DCI 1_0 with a CRC scrambled by an RA-RNTI in response to a PRACH transmission, such as a PRACH preamble transmission. In some examples, the DCI 1_0 contains scheduling information for a downlink shared channel carrying a RAR message. In such examples, the DCI 1_0 may have 16 reserved bits. In some implementations, the reserved bits may be used to indicate a repetition configuration. In some implementations, the repetition configuration applies to an initial random access procedure message scheduled by the RAR message. In other implementations, the repetition configuration may apply to both the initial physical uplink channel transmission and also a physical uplink channel retransmission.

Figure 8:
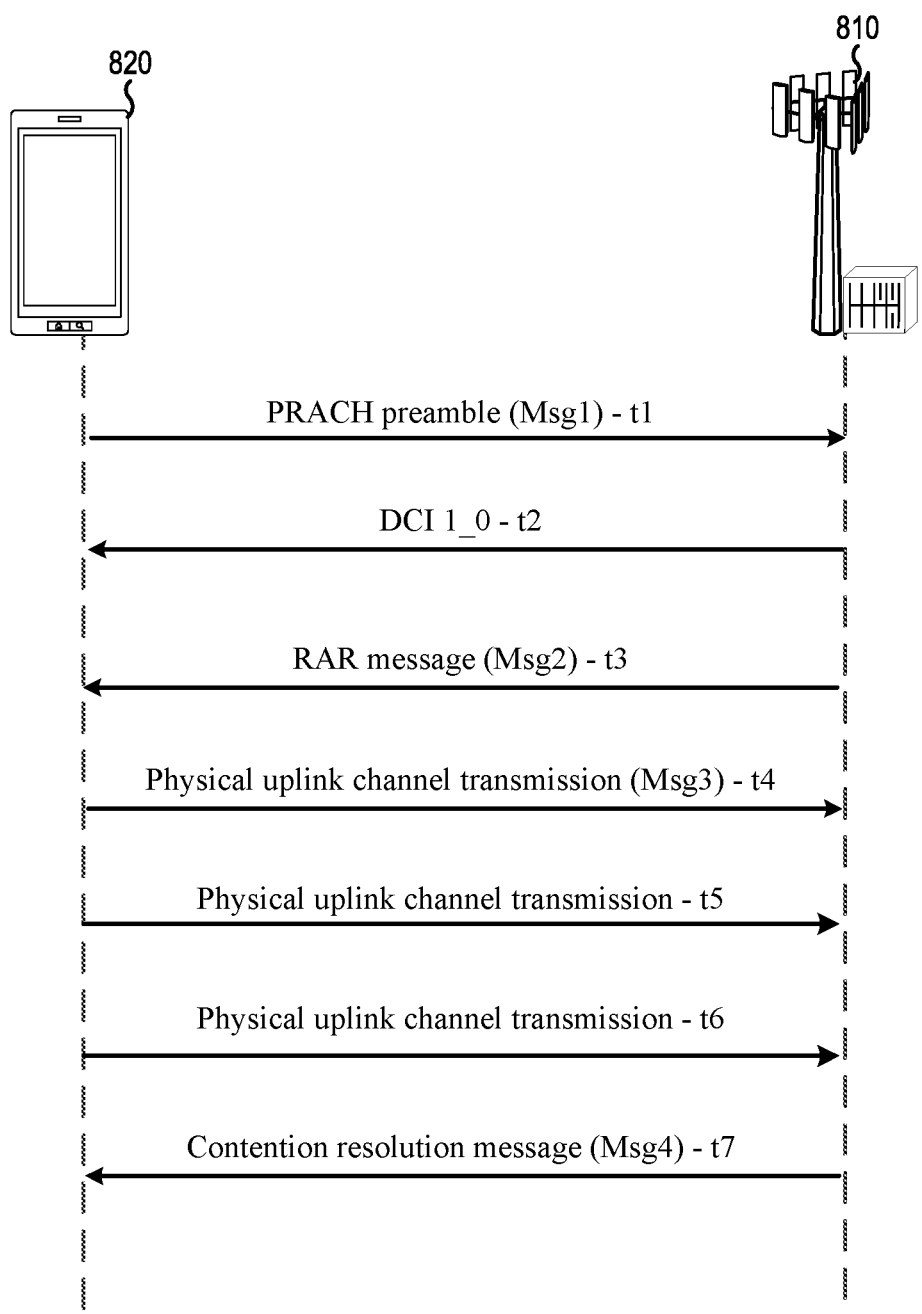
FIG. 8 is a timing diagram illustrating an example of a four-step random access procedure that supports repetition of random access procedure messages, in accordance with various aspects of the present disclosure.

FIG. 8 is a timing diagram 800 illustrating an example of a four-step random access procedure that supports repetition of random access procedure messages, in accordance with various aspects of the present disclosure. In the example of FIG. 8, a UE 820 and a base station 810 may be devices of a wireless communication system, such as the wireless communication system 100 of FIG. 1. The UE 820 may be an example of the UE 120 described with reference to FIG. 1. Additionally, the base station 810 may be an example of the base station 110 described with reference to FIG. 1.

In the example of FIG. 8, the operations of the wireless communication system at times t1, t3, t4, and t7 are the same as the operations at times t1, t2, t3, and t5, respectively, as described with respect to FIG. 3. For brevity, some of the description of the operations at times t1, t3, t4, and t7 is omitted. As shown in FIG. 8, at time t2, the base station 810 transmits DCI 1_0 to the UE 820 in response to the PRACH preamble transmitted at time t1. In some implementations, a repetition number indicator may be associated with or more reserved bits of the DCI 1_0. In some examples, the DCI 1_0 may have a CRC scrambled by an RA-RNTI. As described, the repetition may apply for an initial physical uplink channel transmission scheduled by the RAR message received at time t3. In other implementations, the repetition configuration may apply to both the initial physical uplink channel transmission and also physical uplink channel retransmissions. In the example of FIG. 8, the repetition configuration applies to the initial physical uplink channel transmission at time t4 scheduled based on uplink scheduling information included in the RAR message received at time t3. In some implementations, the RAR message (for example, uplink scheduling message) may include a repetition number indicator. In such examples, the repetition number indicator may correspond to TDRA in the RAR message. For brevity, the process for determining the number of repetitions based on the repetition number indicator included in the RAR message is omitted. In the example of FIG. 8, the UE 820 transmits an initial physical uplink channel at time t4. Additionally, as shown in FIG. 8, the UE 820 repeats a transmission of the initial physical uplink channel based on the number of repetitions determine based on the repetition number indicator, such as the repetition number indicator included in the RAR message or the DCI 1_0. In the example of FIG. 8, the number of repetitions may be two. Thus, as shown in FIG. 8, transmission of the physical uplink channel may be repeated at times t5 and t6, respectively. In some examples, the physical uplink channel transmission may be a PUSCH Msg3 transmission.

Figure 9:
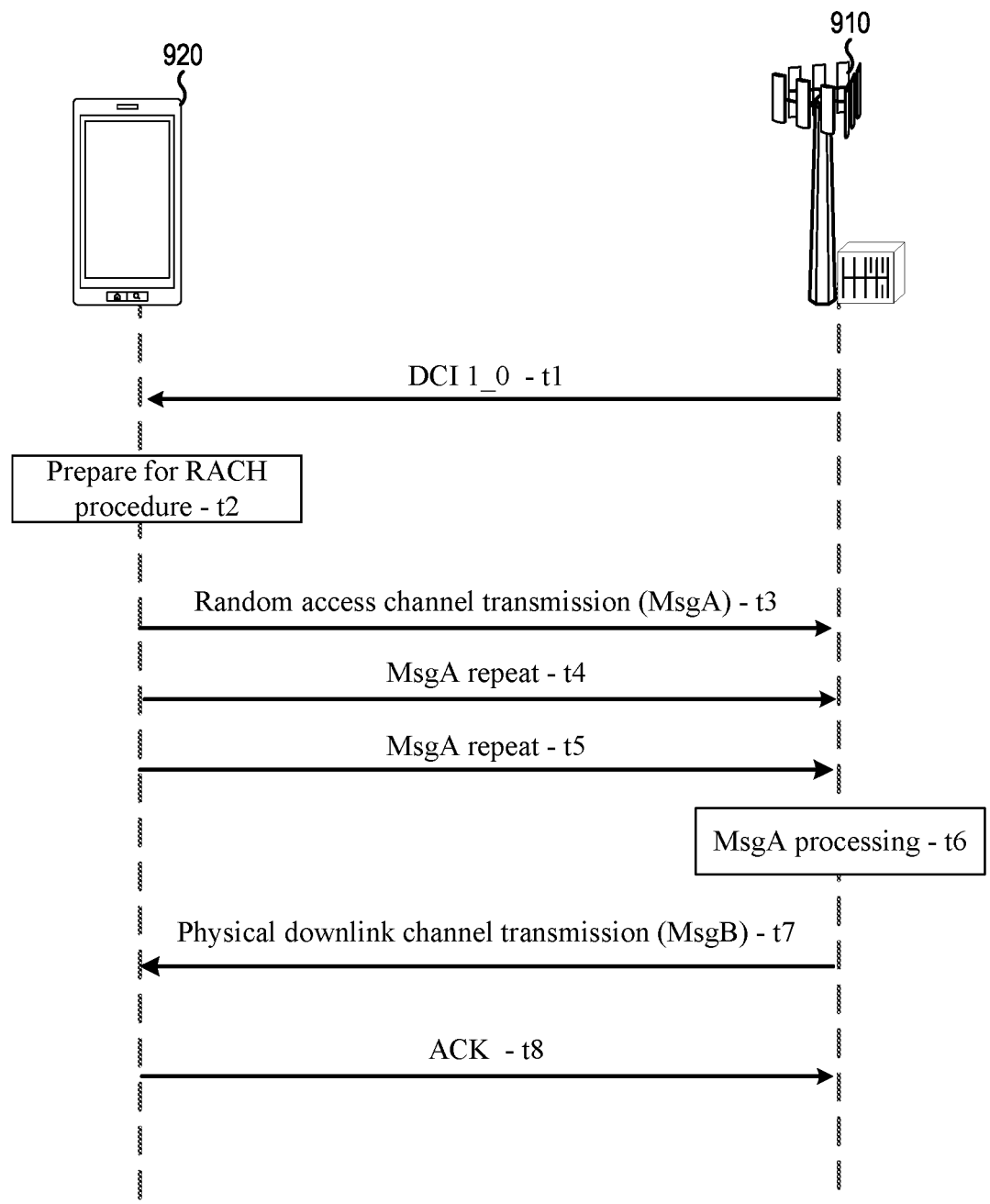
FIG. 9 is a timing diagram illustrating a two-step random access procedure that supports repetition of random access procedure messages, in accordance with various aspects of the present disclosure.

FIG. 9 is a timing diagram 900 illustrating an example of a two-step random access procedure that supports repetition of physical uplink channel transmissions, in accordance with various aspects of the present disclosure. In the example of FIG. 9, a UE 920 and a base station 910 may be devices of a wireless communication system, such as the wireless communication system 100 of FIG. 1. The UE 920 may be an example of the UE 120 described with reference to FIG. 1. Additionally, the base station 910 may be an example of the base station 110 described with reference to FIG. 1.

In the example of FIG. 9, the operations of the wireless communication system at times t2, t3, t6, t7, and t8 are the same as the operations at times t2, t3, t4, t5, and t6, respectively, as described with respect to FIG. 4. For brevity, description of the operations at times t2, t3, t6, t7, and t8 is omitted. As shown in FIG. 9, at time t1, the base station 910 transmits DCI 1_0 including a slot aggregation configuration indicating a repetition configuration in one or more reserved bits. In some examples, the DCI 1_0 may be transmitted on a downlink control channel, such as a PDCCH. In some examples, the DCI 1_0 may have a CRC scrambled by an RA-RNTI. As described, the repetition configuration may apply to an initial physical uplink channel transmission (for example, MsgA). In other implementations, the repetition configuration may apply to both the initial physical uplink channel transmission and also physical uplink channel retransmissions. In the example of FIG. 9, the repetition configuration applies to the initial physical uplink channel transmission at time t3. As shown in FIG. 9, the UE 920 performs an initial physical uplink channel transmission at time t3. Additionally, as shown in FIG. 9, the UE 920 repeats the initial physical uplink channel transmission based on a number of repetitions indicated in the repetition configuration of DCI 1_0. In the example of FIG. 9, the number of repetitions may be two. Thus, as shown in FIG. 9, the physical uplink channel transmission may be repeated at times t4 and t5. The repeated transmissions may be repeated across the slots indicated in the slot aggregation configuration.

Figure 10:
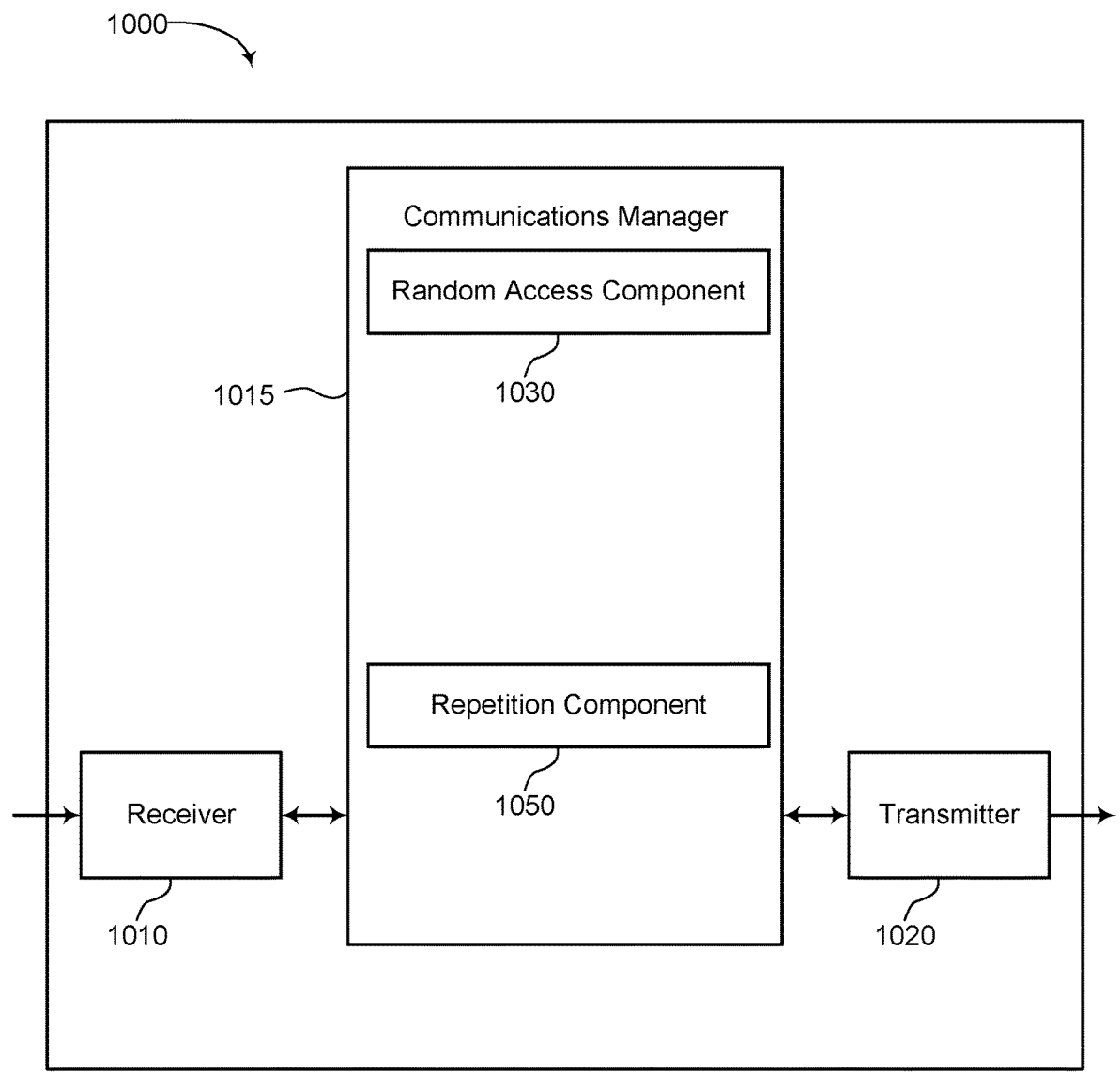
FIG. 10 is a block diagram of a wireless communication device that supports repeating a transmission of a physical uplink channel a random access procedure, in accordance with various aspects of the present disclosure.

FIG. 10 is a block diagram of wireless communication devices that support slot aggregation during a random access procedure, in accordance with various aspects of the present disclosure. The wireless communication device 1000 may be an example of aspects of a UE 120, 320, 420, 520, 620, 720, 820, and 920, or its components, as described with reference to FIGS. 1, 2, 3, 4, 5, 6, 7, 8, and 9, respectively. The wireless communication device 1000 may include a receiver 1010, a communications manager 1015, and a transmitter 1020, which may be in communication with one another (for example, via one or more buses). In some examples, the wireless communication device 1000 is configured to perform operations including operations of the process 1100 described below with reference to FIG. 11.

In some examples, the wireless communication device 1000 can include a chip, system-on-a-chip (SoC), chipset, package, or device that includes at least one processor and at least one modem (for example, a 5G modem or other cellular modem). In some examples, the communications manager 1015, or its sub-components, may be separate and distinct components. In some examples, at least some components of the communications manager 1015 are implemented at least in part as software stored in a memory. For example, portions of one or more of the components of the communications manager 1015 can be implemented as non-transitory code executable by the processor to perform the functions or operations of the respective component.

The receiver 1010 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110, 310, 410, 510, 610, 710, 810, and 910, or its components, as described with reference to FIGS. 1, 2, 3, 4, 5, 6, 7, 8, and 9, respectively.

The received information may be passed on to other components of the device 1000. The receiver 1010 may be an example of aspects of the receive processor 238 described with reference to FIG. 2. The receiver 1010 may include a set of radio frequency (RF) chains that are coupled with or otherwise utilize a set of antennas (for example, the set of antennas may be an example of aspects of the antennas 234a through 234t described with reference to FIG. 2).

The transmitter 1020 may transmit signals generated by the communications manager 1015 or other components of the wireless communication device 1000. The transmitter 1020 may be an example of aspects of the transmit processor 220 described with reference to FIG. 2. The transmitter 1020 may be coupled with or otherwise utilize a set of antennas (for example, the set of antennas may be an example of aspects of the antennas 254a through 254t described with reference to FIG. 2), which may be antenna elements shared with the receiver 1010. In some examples, the transmitter 1020 is configured to perform physical uplink channel transmissions in a PRACH or PUSCH.

The communications manager 1015 may be an example of aspects of the controller/processor 280 described with reference to FIG. 2. The communications manager 1015 includes random access component 1030 and a repetition component 1050. Working in conjunction with the transmitter 1020, the random access component 1030 may transmit a random access preamble to initiate a random access procedure. Additionally, working in conjunction with the receiver 1010, the random access component 1030 may receive a downlink message comprising a repetition number indicator. Additionally, working in conjunction with the transmitter 1020, the repetition component 1250 may transmit a number of repetitions of a physical uplink channel based on the repetition number indicator.

Figure 11:
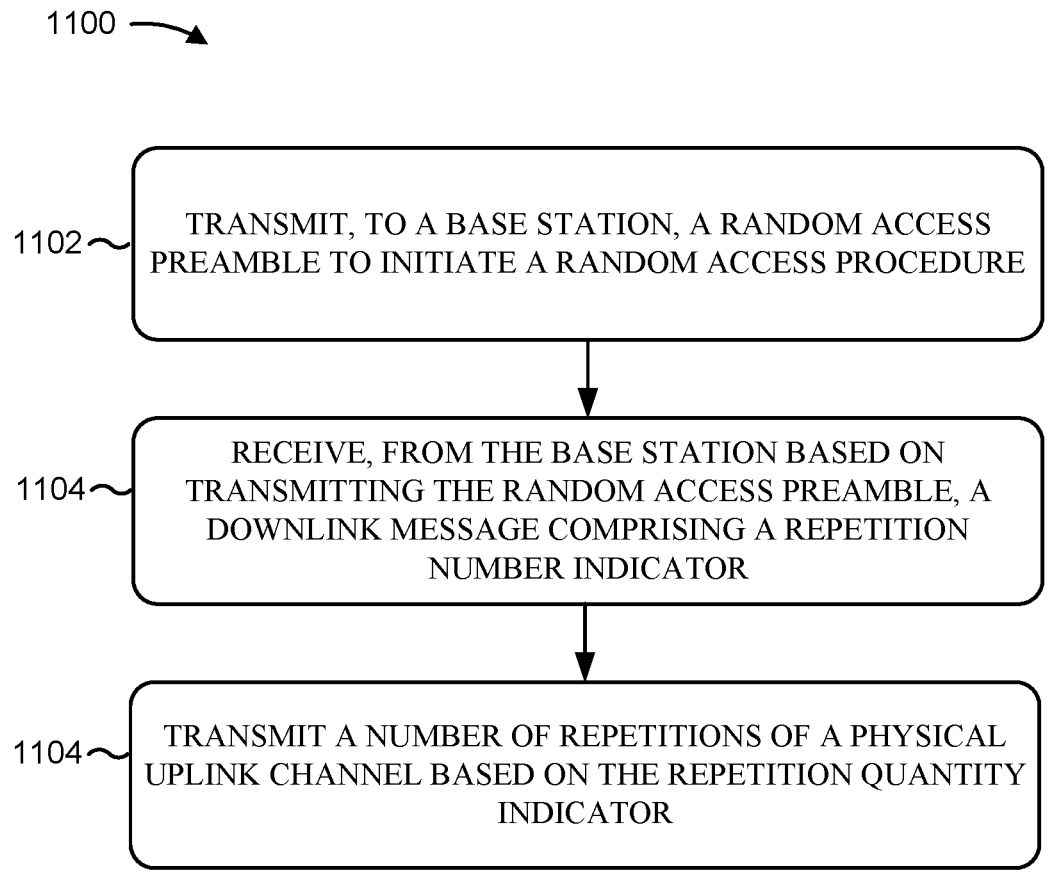
FIG. 11 is a flow diagram illustrating an example process performed at a UE that supports repeating a transmission of a physical uplink channel a random access procedure, in accordance with various aspects of the present disclosure.

FIG. 11 is a diagram illustrating an example process performed at a UE that supports slot aggregation during a random access procedure, in accordance with various aspects of the present disclosure. The operations of the process 1100 may be implemented by a UE, such as a UE 120, 320, 420, 520, 620, 720, 820, and 920, or its components, as described with reference to FIGS. 1, 2, 3, 4, 5, 6, 7, 8, and 9, respectively. For example, operations of the process 1100 may be performed by a communications manager 1015 as described with reference to FIG. 10. In some examples, a UE may execute a set of instructions to control the functional elements of the UE to perform the operations or functions described below. Additionally, or alternatively, a UE may perform aspects of the operations or functions described below using special-purpose hardware.

In block 1102, the process 1100 may transmit, to a base station, a random access preamble to initiate a random access procedure. Additionally, in block 1104, the process 1100 may receive from the base station based on transmitting the random access preamble, a downlink message comprising a repetition number indicator. Finally, in block 1106, the process 1100 may transmit a number of repetitions of a physical uplink channel based on the repetition number indicator.

Figure 12:
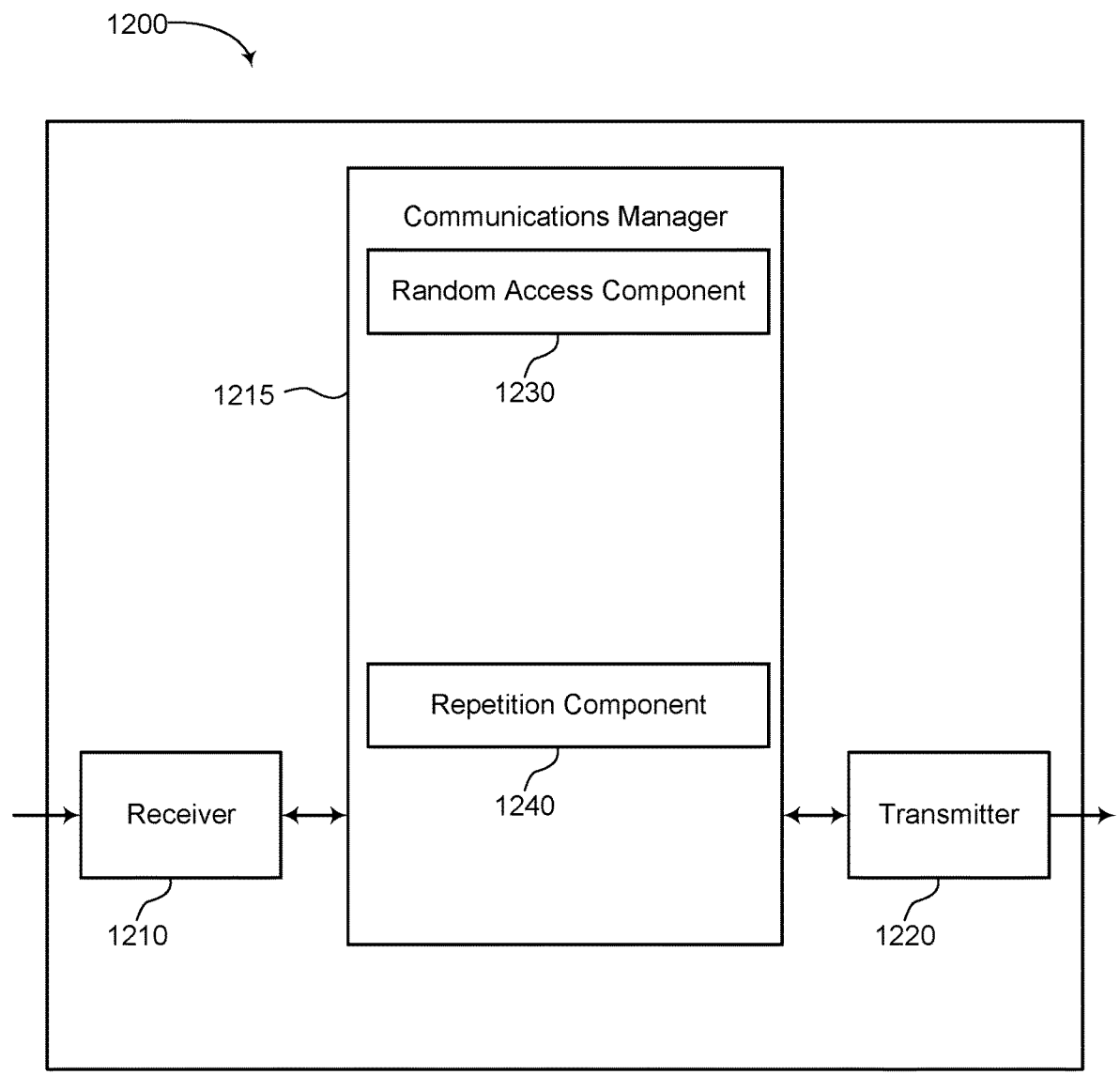
FIG. 12 is a block diagram of a wireless communication device that supports repeating a transmission of a physical uplink channel a random access procedure, in accordance with various aspects of the present disclosure.

FIG. 12 is a block diagram of wireless communication devices that support slot aggregation during a random access procedure, in accordance with various aspects of the present disclosure. The wireless communication device 1200 may be an example of aspects of a UE 120, 320, 420, 520, 620, 720, 820, and 920, or its components, as described with reference to FIGS. 1, 2, 3, 4, 5, 6, 7, 8, and 9, respectively. The wireless communication device 1200 may include a receiver 1210, a communications manager 1215, and a transmitter 1220, which may be in communication with one another (for example, via one or more buses). In some examples, the wireless communication device 1200 is configured to perform operations including operations of the process 1100 described below with reference to FIG. 11.

In some examples, the wireless communication device 1200 can include a chip, system-on-a-chip (SoC), chipset, package, or device that includes at least one processor and at least one modem (for example, a 5G modem or other cellular modem). In some examples, the communications manager 1215, or its sub-components, may be separate and distinct components. In some examples, at least some components of the communications manager 1215 are implemented at least in part as software stored in a memory. For example, portions of one or more of the components of the communications manager 1215 can be implemented as non-transitory code executable by the processor to perform the functions or operations of the respective component.

The receiver 1210 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a UE 120, 320, 420, 520, 620, 720, 820, and 920, or its components, as described with reference to FIGS. 1, 2, 3, 4, 5, 6, 7, 8, and 9, respectively.

The received information may be passed on to other components of the device 1200. The receiver 1210 may be an example of aspects of the receive processor 238 described with reference to FIG. 2. The receiver 1210 may include a set of radio frequency (RF) chains that are coupled with or otherwise utilize a set of antennas (for example, the set of antennas may be an example of aspects of the antennas 234a through 234t described with reference to FIG. 2).

The transmitter 1220 may transmit signals generated by the communications manager 1215 or other components of the wireless communication device 1200. The transmitter 1220 may be an example of aspects of the transmit processor 220 described with reference to FIG. 2. The transmitter 1220 may be coupled with or otherwise utilize a set of antennas (for example, the set of antennas may be an example of aspects of the antennas 234a through 234t described with reference to FIG. 2), which may be antenna elements shared with the receiver 1210. In some examples, the transmitter 1220 is configured to perform physical uplink channel transmissions in a PRACH or PUSCH.

The communications manager 1215 may be an example of aspects of the controller/processor 240 described with reference to FIG. 2. The communications manager 1215 includes random access component 1230 and a repetition component 1240. Working in conjunction with the receiver 1210, the random access component 1230 may receive a random access preamble to initiate a random access procedure. Additionally, working in conjunction with the transmitter 1220, the random access component 1230 may transmit a downlink message comprising a repetition number indicator. Additionally, working in conjunction with the receiver 1210, the repetition component 1240 may receive a number of repetitions of a physical uplink channel based on the repetition number indicator.

Figure 13:
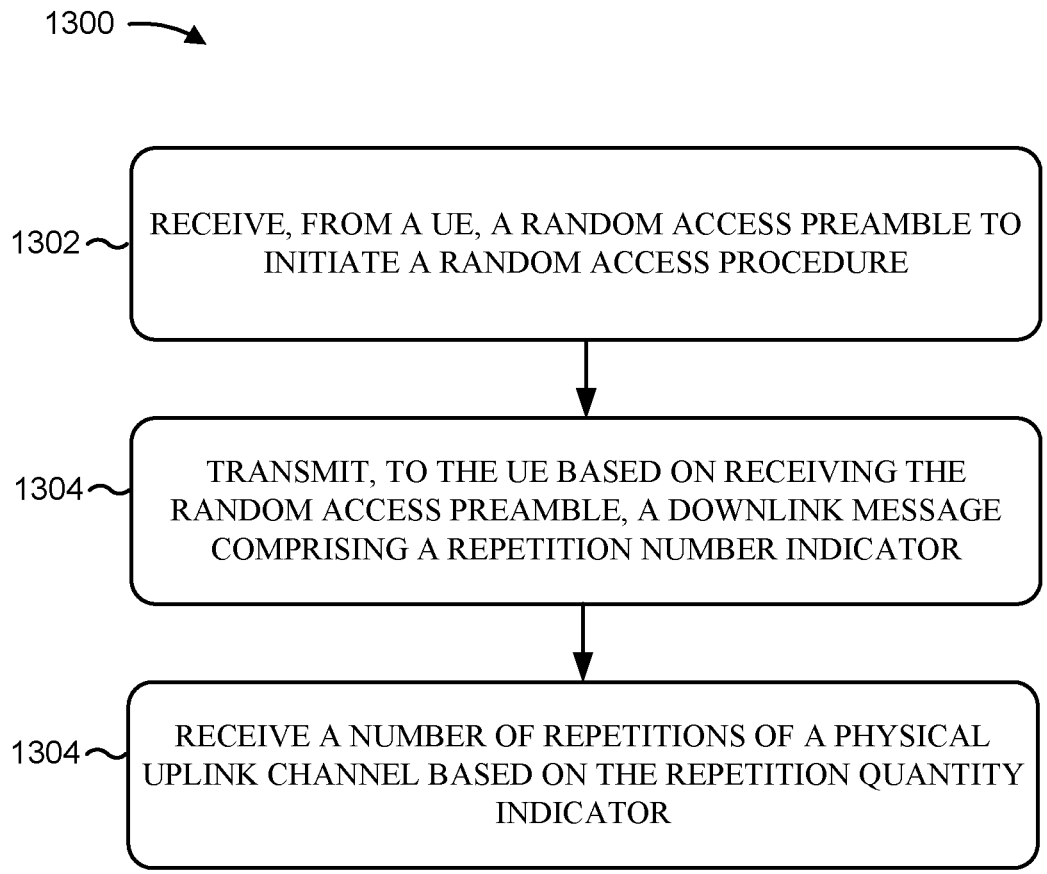
FIG. 13 is a flow diagram illustrating an example process performed at a base station that supports repeating a transmission of a physical uplink channel a random access procedure, in accordance with various aspects of the present disclosure.

FIG. 13 is a diagram illustrating an example process performed at a base station that repeating a transmission of a physical uplink channel during a random access procedure, in accordance with various aspects of the present disclosure. The operations of the process 1300 may be implemented by a base station, such as a base station 110, 310, 410, 510, 610, 710, 810, and 910, or its components, as described with reference to FIGS. 1, 2, 3, 4, 5, 6, 7, 8, and 9, respectively. For example, operations of the process 1200 may be performed by a communications manager 1215 as described with reference to FIG. 12. In some examples, a base station may execute a set of instructions to control the functional elements of the base station to perform the operations or functions described below. Additionally, or alternatively, a base station may perform aspects of the operations or functions described below using special-purpose hardware.

In block 1302, the process 1300 may receive, from a UE, a random access preamble to initiate a random access procedure. Additionally, in block 1304, the process 1300 may transmit, to the UE based on receiving the random access preamble, a downlink message comprising a repetition number indicator. Finally, in block 1306, the process 1300 may receive a number of repetitions of a physical uplink channel based on the repetition number indicator.

The following provides an overview of some Aspects of the present disclosure:

Aspect 1. A method of wireless communication by a UE, comprising:
  transmitting, to a base station, a random access preamble to initiate a random access procedure;
  receiving, from the base station based on transmitting the random access preamble, a downlink message comprising a repetition number indicator; and
  transmitting a number of repetitions of a physical uplink channel based on the repetition number indicator.

Aspect 2. The method of Aspect 1, wherein the physical uplink channel transmission is a message 3 transmission comprising one or more of a connection request message, a scheduling request message, or a buffer status message.

Aspect 3. The method of any of Aspects 1-2, wherein the physical uplink channel is a PUSCH.

Aspect 4. The method of any of Aspects 1-3, wherein:
  the downlink message comprises an uplink scheduling message; and
  the repetition number indicator corresponds to TDRA in the uplink scheduling message.

Aspect 5. The method of Aspect 4, wherein the number of repetitions is based on:
  a repetition number associated with the TDRA; and
  a value of a TPC command field based on the TDRA being unassociated with the repetition number.

Aspect 6. The method of any of Aspects 1-3, wherein:
  the downlink message comprises DCI that includes scheduling information for retransmitting the physical uplink channel transmission; and
  the DCI comprises format 0_0 with a CRC scrambled by a TC-RNTI.

Aspect 7. The method of Aspect 6, wherein:
  the repetition number indicator is associated with one or both of a new data indicator field of the DCI or a HARQ process number field of the DCI; and
  the number of repetitions is based one or both of a value of the new data indicator field or a value of the HARQ process number field respectively associated with the repetition number indicator.

Aspect 8. The method of Aspect 6, wherein:
  the repetition number indicator corresponds to a time domain resource allocation (TDRA) in the scheduling information; and
  the number of repetitions is based on:
    a repetition number associated with the TDRA; and
    one or both of a new data indicator field of the DCI or a HARQ process number field of the DCI based on the TDRA being unassociated with the repetition number.

Aspect 9. The method of any of Aspects 1-8, wherein the number of repetitions for the physical uplink channel transmission is equal to a number of subsequent repetitions of the physical uplink channel transmission.

Aspect 10. The method of any of Aspects 1-8, wherein the number of repetitions for the physical uplink channel transmission is different from a number of subsequent repetitions of the physical uplink channel transmission.

Aspect 11. A method of wireless communication by a base station, comprising:
  receiving, from a UE, a random access preamble to initiate a random access procedure;
  transmitting, to the UE based on receiving the random access preamble, a downlink message comprising a repetition number indicator; and
  receiving a number of repetitions of a physical uplink channel based on the repetition number indicator.

Aspect 12. The method of Aspect 11, wherein the physical uplink channel transmission is a message 3 transmission comprising one or more of a connection request message, a scheduling request message, or a buffer status message.

Aspect 13. The method of any of Aspects 11-12, wherein the physical uplink channel is a PUSCH.

Aspect 14. The method of any of Aspects 11-13, wherein:
  the downlink message comprises an uplink scheduling message; and
  the repetition number indicator corresponds to TDRA in the uplink scheduling message.

Aspect 15. The method of Aspect 14, wherein the number of repetitions is based on:
  a repetition number associated with the TDRA; and
  a value of a TPC command field based on the TDRA being unassociated with the repetition number.

Aspect 16. The method of Aspects 11-13, wherein:
  the downlink message comprises DCI that includes scheduling information for retransmitting the physical uplink channel transmission; and
  the DCI comprises format 0_0 with a CRC scrambled by a TC-RNTI.

Aspect 17. The method of Aspect 16, wherein:
  the repetition number indicator is associated with one or both of a new data indicator field of the DCI or a HARQ process number field of the DCI; and
  the number of repetitions is based one or both of a value of the new data indicator field or a value of the HARQ process number field respectively associated with the repetition number indicator.

Aspect 18. The method of Aspect 16, wherein:
  the repetition number indicator corresponds to a TDRA in the scheduling information; and
  the number of repetitions is based on:
    a repetition number associated with the TDRA; and
    one or both of a new data indicator field of the DCI or a HARQ process number field of the DCI based on the TDRA being unassociated with the repetition number.

Aspect 19. The method of any of Aspects 11-18, wherein the number of repetitions for the physical uplink channel transmission is equal to a number of subsequent repetitions of the physical uplink channel transmission.

Aspect 20. The method of any of Aspects 11-18, wherein the number of repetitions for the physical uplink channel transmission is different from a number of subsequent repetitions of the physical uplink channel transmission.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, or a combination of hardware and software. As used, a processor is implemented in hardware, firmware, or a combination of hardware and software.

It will be apparent that systems or methods described may be implemented in different forms of hardware, firmware, or a combination of hardware and software. The actual specialized control hardware or software code used to implement these systems or methods is not limiting of the aspects. Thus, the operation and behavior of the systems or methods were described without reference to specific software code—it being understood that software and hardware can be designed to implement the systems or methods based, at least in part, on the description.

As used, "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed may be implemented as electronic hardware, firmware, software, or combinations of hardware, firmware, or software, including the structures disclosed in this specification and the structural equivalents thereof. The interchangeability of hardware, firmware, and software has been described generally, in terms of functionality, and illustrated in the various illustrative components, blocks, modules, circuits, and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined may be applied to other implementations without departing from the spirit or scope of this disclosure. Thus, the claims are not intended to be limited to the implementations shown, but are to be accorded the widest scope consistent with this disclosure, the principles and the novel features disclosed.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus for wireless communications at a user equipment (UE), comprising:
   one or more processors;
   one or more memories coupled with the one or more processors that store instructions that are operable, when executed by the one or more processors, to cause the apparatus to:
     transmit, to a base station, a random access preamble to initiate a random access procedure;
     receive, from the base station, a downlink message including:
       a random access response (RAR) that includes a time domain resource allocation (TDRA) for a physical uplink channel, wherein a number of repetitions associated with transmitting the physical uplink channel is associated with a value of a transmission power control (TPC) command field; or
       downlink control information (DCI) that includes a TDRA for retransmitting the physical uplink channel, wherein a number of repetitions associated with retransmitting the physical uplink channel is associated with one or both of a new data indicator field of the DCI or a hybrid automatic repeat request (HARQ) process number field of the DCI; and
     transmit the physical uplink channel in accordance with the number of repetitions associated with transmitting the physical uplink channel or retransmit the physical uplink channel in accordance with the number of repetitions associated with retransmitting the physical uplink channel.

2. The apparatus of claim 1, wherein the physical uplink channel is a message 3 transmission of the random access procedure that includes one or more of a connection request message, a scheduling request message, or a buffer status message.

3. The apparatus of claim 1, wherein the physical uplink channel is a physical uplink shared channel (PUSCH).

4. The apparatus of claim 1, wherein the DCI comprises format 0_0 with a cyclic redundancy check (CRC) scrambled by a temporary cell-radio network temporary identifier (TC-RNTI).

5. A method of wireless communication by a user equipment (UE), comprising:
   transmitting, to a base station, a random access preamble to initiate a random access procedure;
   receiving, from the base station, a downlink message including:
     a random access response (RAR) that includes a time domain resource allocation (TDRA) for a physical uplink channel, wherein a number of repetitions associated with transmitting the physical uplink channel is associated with a value of a transmission power control (TPC) command field; or
     downlink control information (DCI) that includes a TDRA for retransmitting the physical uplink channel, wherein a number of repetitions associated with retransmitting the physical uplink channel is associated with one or both of a new data indicator field of the DCI or a hybrid automatic repeat request (HARQ) process number field of the DCI; and transmitting the physical uplink channel in accordance with the number of repetitions associated with transmitting the physical uplink channel or retransmitting the physical uplink channel in accordance with the number of repetitions associated with retransmitting the physical uplink channel.

6. The method of claim 5, wherein the physical uplink channel is a message 3 transmission of the random access procedure that includes one or more of a connection request message, a scheduling request message, or a buffer status message.

7. The method of claim 5, wherein the physical uplink channel is a physical uplink shared channel (PUSCH).

8. The method of claim 5, wherein the DCI comprises format 0_0 with a cyclic redundancy check (CRC) scrambled by a temporary cell-radio network temporary identifier (TC-RNTI).

9. An apparatus for wireless communications at a base station, comprising:

one or more processors;

one or more memories coupled with the one or more processors that store instructions that are operable, when executed by the one or more processors, to cause the apparatus to:

receive, from a user equipment (UE), a random access preamble to initiate a random access procedure;

transmit, to the UE, a downlink message including:

a random access response (RAR) that includes a time domain resource allocation (TDRA) for a physical uplink channel, wherein a number of repetitions associated with transmitting the physical uplink channel is associated with a value of a transmission power control (TPC) command field; or downlink control information (DCI) that includes a TDRA for retransmitting the physical uplink channel, wherein a number of repetitions associated with retransmitting the physical uplink channel is associated with one or both of a new data indicator field of the DCI or a hybrid automatic repeat request (HARQ) process number field of the DCI; and receive transmissions of the physical uplink channel in accordance with the number of repetitions associated with transmitting the physical uplink channel or receive retransmissions of the physical uplink channel in accordance with the number of repetitions associated with retransmitting the physical uplink channel.

10. The apparatus of claim 9, wherein the physical uplink channel is a message 3 transmission of the random access procedure that includes one or more of a connection request message, a scheduling request message, or a buffer status message.

11. The apparatus of claim 9, wherein the physical uplink channel is a physical uplink shared channel (PUSCH).

12. The apparatus of claim 9, wherein the DCI comprises format 0_0 with a cyclic redundancy check (CRC) scrambled by a temporary cell-radio network temporary identifier (TC-RNTI).

13. A method of wireless communication by a base station, comprising:

receiving, from a user equipment (UE), a random access preamble to initiate a random access procedure;

transmitting, to the UE, a downlink message including:

a random access response (RAR) that includes a time domain resource allocation (TDRA) for a physical uplink channel, wherein a number of repetitions associated with transmitting the physical uplink channel is associated with a value of a transmission power control (TPC) command field; or downlink control information (DCI) that includes a TDRA for retransmitting the physical uplink channel, wherein a number of repetitions associated with retransmitting the physical uplink channel is associated with one or both of a new data indicator field of the DCI or a hybrid automatic repeat request (HARQ) process number field of the DCI; and receiving transmissions of the physical uplink channel in accordance with the number of repetitions associated with transmitting the physical uplink channel or receiving retransmissions of the physical uplink channel in accordance with the number of repetitions associated with retransmitting the physical uplink channel.

14. The method of claim 13, wherein the physical uplink channel is a message 3 transmission of the random access procedure that includes one or more of a connection request message, a scheduling request message, or a buffer status message.

15. The method of claim 13, wherein the physical uplink channel is a physical uplink shared channel (PUSCH).

16. The method of claim 13, wherein the DCI comprises format 0_0 with a cyclic redundancy check (CRC) scrambled by a temporary cell-radio network temporary identifier (TC-RNTI).

* * * * *